(12) United States Patent
Asada et al.

(10) Patent No.: US 6,496,453 B2
(45) Date of Patent: Dec. 17, 2002

(54) OPTICAL PICKUP

(75) Inventors: Junichi Asada, Ibaraki (JP); Kenji Nagashima, Suita (JP); Hiroshi Kayama, Takatsuki (JP); Youichi Saitoh, Hirakata (JP); Seiji Nishiwaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 106 days.

(21) Appl. No.: 09/817,421

(22) Filed: Mar. 26, 2001

(65) Prior Publication Data

US 2001/0028625 A1 Oct. 11, 2001

(30) Foreign Application Priority Data

Mar. 27, 2000 (JP) ........................................ 2000-087576
May 31, 2000 (JP) ........................................ 2000-163802

(51) Int. Cl.⁷ ................................................ G11B 7/00
(52) U.S. Cl. ............................... 369/44.23; 369/112.24; 369/112.14
(58) Field of Search .......................... 369/44.11, 44.12, 369/44.14, 44.23, 44.28, 112.01, 112.1, 112.14, 112.23, 112.24, 112.27

(56) References Cited

U.S. PATENT DOCUMENTS 4,769,803 A * 9/1988 Yamamiya ................ 369/44.25
5,539,718 A * 7/1996 Hoshi et al. ................ 369/116

* cited by examiner

Primary Examiner—Muhammad Edun
(74) Attorney, Agent, or Firm—RatnerPrestia

(57) ABSTRACT

An optical pickup has
- a light source that emits a light beam having a far field pattern being elliptical in cross section;
- a collimator lens that converts the light beam from the light source into a substantially parallel light beam;
- a beam shaping element that performs beam shaping by changing a substantial aspect ratio of the far field pattern of the light beam from the collimator lens;
- light condensing means of condensing the light beam shaped by the beam shaping element on an optical information recording medium; and
- light detecting means of detecting a light beam reflected at the optical information recording medium.
- wherein the beam shaping element makes the cross section of the light beam having been shaped close to a circle by compressing the light beam substantially in a direction of a major axis of the elliptical cross section of the far field pattern, and reflects the light beam from the collimator lens to the light condensing means.

19 Claims, 23 Drawing Sheets

OPTICAL PICKUP

BACKGROUND OF THE INVENTION

1. Field of the Invention

The present invention relates to an optical pickup for optically recording and reproducing information onto and from optical disks.

2. Description of the Prior Art

The structure of a conventional optical pickup will be described with reference to FIG. 20. The optical pickup shown in FIG. 20 has two laser light sources of different wavelengths, that is, a semiconductor laser 101 of a wavelength of 660 nm that performs recording and reproduction onto and from high-density media such as digital versatile disks (DVDs), and a semiconductor laser 115 of a wavelength of 780 nm that performs reproduction from media such as compact disks (CDs).

To an actuator movable member 111 of the optical pickup, two kinds of objective lenses 107 and 118 are attached, and switching between the two kinds of objective lenses is made by the actuator movable member 111 rotating about a rotation shaft 120. The two kinds of objective lenses 107 and 118 are switched between when recording or reproduction onto or from a disk 108 with a base material thickness of 0.6 mm such as a DVD is performed and when reproduction from a disk 109 with a base material thickness of 1.2 mm such as a CD is performed by the different light sources.

First, an optical system that performs recording and reproduction onto and from media such as DVDs will be described. A light beam emitted from the semiconductor laser 101 of high power is converted into a parallel beam by a collimator lens 102, and is incident on a mirror 103. On the mirror 103, a wavelength selective film is formed where light of a wavelength of 660 nm is mostly transmitted and partly reflected and light of a wavelength of 780 nm is substantially totally reflected. Therefore, an extremely small part of the light beam incident on the mirror 103 is reflected and most of the light beam is transmitted. The reflected part of the light beam is directed to a photodetector 110, where the light quantity of the light beam is detected. By doing this, the emission power of the semiconductor laser 101 is monitored to satisfy the function of keeping constant the power on the disk surface in recording and reproduction.

The light transmitted by the mirror 103 is reflected at a reflecting mirror 106, and is transmitted by a polarizing hologram 104 provided on the actuator movable member 111. The polarizing hologram is formed by forming a grating with a depth d on a substrate of an anisotropic material such as lithiumniobate and filling an isotropic material (refractive index n1) in the grooves of the grating. Generally, when the phase difference between light passing through the grooves and light passing between the grooves is $\phi$, the transmittance is represented by $\cos^2(\Phi/2)$. When the refractive indices of the substrate for polarized light parallel to the grating grooves and polarized light vertical to the grating grooves are n1 and n2, respectively, for the polarized light parallel to the grating grooves, since $\phi=0$, the transmittance is 1. For the polarized light vertical to the grating grooves, since $\phi=2\pi(n1-n2) d/\lambda$, by setting the depth d so that $\phi=\pi$, the transmittance is 0 and the polarized light is completely diffracted.

Therefore, by considering the polarization direction of the light beam emitted from the semiconductor laser 101 and the bearing of the grooves of the polarizing hologram 104, the light beam from the light source can be transmitted without diffracted when passing through the polarizing hologram 104. The transmitted light is converted from linearly polarized light to circularly polarized light by a quarter wave plate 105, is aperture-limited by an objective lens attachment hole of the actuator movable member 111, is incident on the objective lens 107, and is condensed on the signal surface of the disk 108 with a material thickness of 0.6 mm.

The light beam reflected at the disk 108 passes through the objective lens 107, and is transmitted by the wave plate 105. Since the light beam is converted into linearly polarized light orthogonal to the direction in which the light beam is polarized on the way to the disk 108 at this time, most of the light beam is diffractivey branched by the polarizing hologram 104. These diffracted light beams are reflected at the reflecting mirror 106, are transmitted by the mirror 103, pass through the collimator lens 102, and are condensedly incident on a photodetector 117 integrated with the laser 101. By use of variations in the quantity of this light, a servo signal and an RF signal such as a focus signal or a tracking signal can be obtained.

Next, an optical system that performs reproduction from media such as CDs by use of the other semiconductor laser 115 will be described. A light beam emitted from the semiconductor laser 115 is diffractively branched to ±first order light and to zero order light by passing through a glass hologram 114 not depending on polarization. These light beams are condensed by a collimator lens 113, are reflected at a mirror 112, the mirror 103 and the reflecting mirror 106, are incident on the objective lens 118 provided on the actuator movable member 111, and are condensed as three spots on the signal surface of the disk 109 with a base material thickness of 1.2 mm. The main beam spot is used for an RF signal, and the two sub beam spots, for three beam tracking.

The light beam reflected at the disk 109 passes through the objective lens 108, the reflecting mirror 106, the mirror 103, the mirror 112 and the collimator lens 113, is further diffractively branched by the glass hologram 114, and is condensedly incident on a photodetector 119 integrated with the semiconductor laser 115. By use of variations in the quantity of this light, a servo signal and an RF signal can be obtained.

In optical pickups that perform recording and reproduction of highly dense signal pits such as those on DVDs, it is required to form very small and high-quality light condensation spots on the optical disk surface. Generally, the size of a light condensation spot depends on the numerical aperture (NA) of the objective lens, the light wavelength $\lambda$, and the light intensity at the aperture pupil end of the objective lens, that is, the rim intensity. The light source wavelength $\lambda$ and the NA of the objective lens are defined by a specification or the like, for example, for DVDs; $\lambda$ is approximately 650 nm, and NA is 0.6. However, to ensure the spot quality commensurate with the numerical aperture, it is necessary to secure a sufficient rim intensity.

Generally, a light beam emitted from a semiconductor laser has an elliptical far field pattern. For this reason, in the optical pickup structure shown as a conventional example, when the rim intensity in the direction of minor axis of the far field pattern is ensured, the rim intensity is considerably high in the direction of the major axis, that is, the amount of eclipse, due to the aperture limitation, of the light beam incident on the objective lens is considerably large in the direction of the major axis.

In an optical pickup for recording, high optical power is required on the disk surface; a power of approximately 12 to 17 mW is necessary as the objective lens exit light quantity. Therefore, it is necessary to cause the optical pickup to operate within the emission power rating of the laser light source by maximizing the transmission efficiency of the optical system. However, in the conventional structure, since the amount of eclipse in the direction of major axis of the emission far field pattern is large, the light quantity loss is large, so that to ensure the power on the disk surface, the margin for the maximum rating is small even though a high-power laser is used.

FIG. 21 is a view showing the structure of another conventional optical pickup for preventing such a light quantity loss. Since the structure of this optical pickup is substantially the same as that of the conventional example of FIG. 20 except for some parts, detailed description thereof is omitted. In the conventional example shown in FIG. 21, a light beam emitted from a high-power semiconductor laser 201 is converted into a substantially parallel beam by a collimator lens 202, and has its diameter increased only in the Y direction of FIG. 21 by being refracted and transmitted by a triangular prism 221, so that the elliptical far field pattern shown by the broken line enlarges in the direction of the minor axis into a circular far field pattern as shown by the solid line. Therefore, by performing such beam shaping, light use efficiency can be increased.

However, in this case, the number of parts of the optical system increases as shown in FIG. 21 and the optical system layout is difficult, so that the size of the optical pickup increases and the number of man-hours of assembly and cost increase.

The far field pattern means the intensity distribution of light on a surface away from the light emission point of a laser light source. Generally, in the case of a semiconductor laser used as a light source for optical disks, the far field pattern is an elliptical intensity distribution such that an emission angle θa in the horizontal direction of the laser chip, that is, in the polarization direction of the emission linearly polarized light and an emission angle θb in a direction orthogonal thereto satisfy the relationship of the following expression (1):

$$\frac{1}{4} < (\theta a / \theta b) < \frac{1}{2} \quad (1)$$

Another problem of the conventional example is aberrations of the optical system. Generally, optical parts constituting an optical system have a certain amount of aberration such as spherical aberration, coma aberration or astigmatism. When such aberration is present, light condensation spots formed by the objective lens are distorted, which significantly affects the recording quality and the reproduction signal quality. Therefore, in manufacturing optical pickups, it is customary to clarify the aberration specifications of the optical elements constituting the optical system and not to use optical elements exceeding a limit.

However, even though a specification is provided to each optical element, the light condensation spot quality cannot be prevented from being degraded by the aberrations of the optical elements accumulating. Particularly, to optical pickups that perform recording and reproduction of highly dense signals, spot distortion is fatal. Moreover, coma aberration and astigmatism significantly affect the margin performance in recording and reproduction because spots are asymmetrically distorted at the time of defocus where the distance between the disk and the best image point increases and decreases.

Coma aberration can be removed when the head is assembled by a tilt adjustment of the objective lens. However, in conventional optical pickups, when astigmatisms of component parts are accumulated, for example, in the same direction, light condensation spots have large astigmatism, so that characteristics for defocus and the like are significantly degraded.

As described above, it is demanded that optical disk apparatuses for recording or reproducing information by use of laser beams be reduced in size, and attempts have been made to reduce optical pickups in size and weight. Typical examples thereof include optical disk apparatuses that records information onto a disk or reproduces information recorded on a disk by use of a semiconductor laser. In these apparatuses, to enhance light use efficiency and obtain light spots having an axisymmetric intensity distribution, it is necessary that the equal intensity line shape of the light beams (hereinafter, abbreviated as the beam shape) be circular.

As described above, since a light beam emitted from a semiconductor laser generally diverges at different angles in directions horizontal and vertical to the p-n junction surface, when the light beam is collimated by use of a collimator lens, the beam shape thereof is elliptical. Therefore, an optical system that converts the elliptical light beam into a circular light beam has previously been proposed.

Or even when it is not highly necessary to enhance light use efficiency and it is unnecessary to shape the elliptical light beam into a circular light beam, there are cases where astigmatism is caused by a laser light source and optical parts and consequently, the quality of the beam spots obtained by the laser light source is degraded. Therefore, a technique has been proposed of making an adjustment to improve the spot quality by generating astigmatism for correction by inserting a beam shaping prism that has a slight beam shaping effect into the optical system and slightly changing the parallelism of the light beam passing through the beam shaping prism.

When conventional optical disks that are set to use wavelengths of 780 nm to 830 nm like CDs although capable of reducing the wavelength of the light source used, improving the optical resolution and increasing the recordable or reproducible frequency band to achieve high density like DVDs is reproduced with a shorter-wavelength semiconductor laser, a sufficient reproduction signal or control signal cannot be obtained because of differences in the reflectance, the absorptance and the like of the recording surface. This problem is noticeable in disks such as CD-Rs standardized as writable CDs and of which reflecting film has a high wavelength dependency.

To solve the above-mentioned two problems, a method has been considered in which two light sources as shown in FIGS. 22 and 23 are used and a beam shaping function is additionally provided.

FIGS. 22 and 23 are views showing the structure of a conventional optical pickup using this method. FIG. 22 shows a case where a high-density optical disk 1044 with abase material thickness of 0.6 mm is reproduced. FIG. 23 shows a case where an optical disk 1050 with a base material thickness of 1.2 mm is reproduced.

In FIG. 22, a light beam 1037 of a wavelength of 650 nm emitted from a semiconductor laser 1060a of a first module 1060 passes through a hologram 1060c, and is converted into an elliptical parallel beam by a condensing lens 1038. The first module 1060 is oriented so that the direction of major axis of the ellipse of the beam pattern coincides with the direction of thickness of the optical disk apparatus. In this figure, since the structure of each optical pickup is two-dimensionally shown, the direction in which the light beam is decentered at a totally reflecting mirror 1041, which direction is actually vertical to the plane of the figure, is rotated 90 degrees about the center of the optical axis on the A plane. This applies to the figures described later.

The elliptical parallel beam is shaped into a circular beam by a beam shaping prism 1039, passes through a compound prism 1040, has its optical path vertically bent at the totally reflecting mirror 1041, passes through aperture limiting means 1042, is condensed by an objective lens 1043, and is applied onto the surface of the optical disk 1044 as a minute light spot 1045. The aperture limiting means 1042 is structured so that light of a wavelength of 650 nm is all transmitted thereby and of light of a wavelength of 780 nm, only an inner part corresponding to a numerical aperture of 0.45 is transmitted thereby. Moreover, the aperture limiting means 1042 is designed so as to be most suitable for a case where the numerical aperture of the objective lens 1043 is 0.6 and the base material thickness of the optical disk 1044 is 0.6 mm. Therefore, the light beam 1037 of a wavelength of 650 nm is converged with a numerical aperture of 0.6.

Then, a light beam 1046 reflected at the optical disk 1044 again passes through the objective lens 1043, has its optical path horizontally bent at the mirror 1041, passes through the compound prism 1040, and is then again incident on the beam shaping prism 1039.

Since the optical path at the beam shaping prism 1039 is reverse in direction to the above-mentioned optical path, the circular reflected beam is reduced in the direction of thickness of the optical pickup into an elliptical beam by the beam shaping prism 1039.

The reflected beam converted into an elliptical beam is converged by the condensing lens 1038, and is incident on the first module 1060. The light beam 1046 incident on the first module 1060 is diffracted at the hologram 1060*c*, and is incident on a photodetector 1060*b* to detect a focus control signal for causing the objective lens 1043 to follow the recording surface by use of a so-called SSD (spot size detection) method and a tracking control signal for causing the objective lens 1043 to follow the tracks on the track surface by use of a phase difference method.

Moreover, as shown in FIG. 23, a second module 1047 is provided with a semiconductor laser 1047*a* of a wavelength of 780 nm. A light beam 1049 of a wavelength of 780 nm emitted from the second module 1047 passes through a hologram 1047*c*, and is incident on the compound prism 1040. The light beam 1049 slightly diverged by being condensed by a condensing lens 1048 is incident on the compound prism 1040, and is reflected at an optical film 1040*a*. The light beam 1049 is further reflected at the totally reflecting mirror 1041, and then, only an inner part thereof corresponding to a numerical aperture of 0.45 is transmitted by the aperture limiting means 1042, is incident on the objective lens 1043, and forms a light spot 1051 on the recording surface of the optical disk 1050. By limiting the aperture only in the case of a wavelength of 780 nm, the numerical aperture is 0.45, so that the optical disk 1050 with a base material thickness of 1.2 mm like a CD can be handled.

A light beam 1052 reflected at the optical disk 1050 again passes through the objective lens 1043 and the aperture limiting means 1042, has its optical path horizontally bent at the totally reflecting mirror 1041, and is incident on the compound prism 1040. The incident light beam is mostly reflected at the optical film 1040*a*, is converged by the condensing lens 1048, and is incident on the second module 1047. The light beam 1052 incident on the second module 1047 is diffracted at the hologram 1047*c*, and is incident on a photodetector 1047*b* to detect a focus control signal for causing the objective lens 1043 to follow the recording surface by use of the SSD method and a tracking control signal for causing the objective lens 1043 to follow the tracks on the track surface by use of a push-pull method. While generally, a three beam method is frequently used for the tracking control signal for CDs, in this conventional example, the push-pull method is used for simplification of explanation.

By using the optical system as described above, when the high-density optical disk 1044 designed for a wavelength of 650 nm is reproduced, the semiconductor laser 1060*a* is turned on, the light beam is brought to a focus on the optical disk 1044, and the reflected light therefrom is received by the photodetector 1060*b*, whereby the reproduction signal and the control signal can be obtained, and when the optical disk 1050 designed for a wavelength of 780 nm is reproduced, the semiconductor laser 1047*a* is turned on, the light beam is brought to a focus on the optical disk 1050, and the reflected light therefrom is received by the photodetector 1047*b*, whereby the reproduction signal and the control signal can be obtained. In this manner, reproduction and recording are performed from and onto the optical disks 1044 and 1050 that are different in thickness and the wavelength for which they are designed.

However, in the above-described prior art, since the beam shaping prism 1039 is inserted between the first module 1060 and the compound prism 1040, the overall optical path length of the optical system is large, so that it is difficult to reduce the optical pickup in size and thickness.

When the beam shaping means is added to the totally reflecting mirror 1041 or the compound prism 1040 for size reduction, since the light beam 1049 emitted from the second module 1047 is not a parallel beam when passing through the beam shaping means, astigmatism is generated, so that an excellent spot cannot be obtained.

SUMMARY OF THE INVENTION

An object of the present invention is to provide an optical pickup in which light use efficiency is enhanced without the number of parts increased and light condensing power is ensured.

Another object of the present invention is to realize a structure correcting astigmatism of the optical system.

Yet another object of the present invention is to realize with a simple structure an optical pickup comprising an optical system having two different light sources and NAs.

Still another object of the present invention is to provide an optical pickup, having a plurality of light emission sources, that is small in size and can be manufactured inexpensively, in which a light beam can be converged into an excellent light spot on an optical disk even though a beam shaping function is provided.

One aspect of the present invention is an optical pickup comprising:

a light source that emits a light beam having a far field pattern being elliptical in cross section;

a collimator lens that converts the light beam from said light source into a substantially parallel light beam;

a beam shaping element that performs beam shaping by changing a substantial aspect ratio of the far field pattern of the light beam from said collimator lens;

light condensing means of condensing the light beam shaped by said beam shaping element on an optical information recording medium; and light detecting means of detecting a light beam reflected at said optical information recording medium.

wherein said beam shaping element makes the cross section of the light beam having been shaped close to a circle by compressing the light beam substantially in a direction of a major axis of the elliptical cross section of the far field pattern, and reflects the light beam from said collimator lens to said light condensing means.

Another aspect of the present invention is an optical pickup wherein said beam shaping element has a light incident and exit surface and a reflecting surface, and the light incident and exit surface and the reflecting surface are nonparallel to each other.

Still another aspect of the present invention is an optical pickup further comprising an adjusting mechanism that corrects an astigmatism in an optical system by changing relative positions of said collimator lens and said beam shaping element.

Yet another aspect of the present invention is an optical pickup wherein said beam shaping element compresses a diameter substantially in the direction of the major axis of the far field pattern within a range of 0.85 to 0.95 with respect to an input light beam.

Still yet another aspect of the present invention is an optical pickup wherein a first light source and a second light source that emit light beams of different wavelengths are provided, and two optical systems comprising said first light source and said second light source share said collimator lens and said beam shaping element.

A further aspect of the present invention is an optical pickup wherein an optical axis of incidence of said collimator lens and an optical axis of incidence on said beam shaping element are different between said two optical systems.

A still further aspect of the present invention is an optical pickup further comprising a light transmitting parallel or nonparallel plate that is disposed between said first light source and said collimator lens and/or between said second light source and said collimator lens.

Further, describing an example of the present invention, a beam shaping element is provided that performs beam shaping in a direction that compresses the light beam in the direction of major axis of the elliptical emission far field pattern of the semiconductor laser. Here, the beam shaping magnification m is defined as the following expression (2):

$$m=d/D \quad (2)$$

where D is the beam diameter in the direction of major axis of the far field pattern before the beam is shaped, and d is the beam diameter in the direction of major axis of the far field pattern after the beam is shaped.

Since the light quantity distribution of the beam is gathered inside by compressing the beam in the direction of major axis of the elliptical emission far field pattern, the quantity of the light eclipsed by the aperture limiting member before the beam is incident on the objective lens is reduced, so that light use efficiency can be enhanced. For the effect of reducing the light quantity loss, it is necessary only that the beam shaping magnification be smaller; it is desirable that the beam shaping magnification be at least not more than 0.95. Moreover, a collimator lens is provided that condenses a light beam emitted from a semiconductor laser, the optical path bending and the shaping of the light beam condensed by the collimator lens are performed by the beam shaping element, and an adjusting mechanism is provided that changes the relative positions of the collimator lens and the beam shaping element along the optical axis.

Generally, a spherical wave is generated by changing the relative distance between the light source and the collimator lens, and by the spherical wave passing through the beam shaping element, an astigmatism corresponding to the degree of sphericity of the spherical wave is generated. By adjusting by using this the position of the collimator lens so that an astigmatism reverse to the astigmatism immanent in the optical system is generated, the astigmatism immanent in the optical system can be canceled, so that the quality of light condensation spot by the objective lens can be ensured.

Moreover, when the magnification of the beam shaping by the beam shaping element is 0.85 or higher, the amount of variation in astigmatism with respect to the movement amount of the collimator lens is appropriate, so that realization of adjustment accuracy in the pickup manufacturing process is enabled. Moreover, by the beam shaping magnification being 1 or lower, the intensity at the aperture pupil end in the direction of major axis of the elliptical far field pattern decreases, so that the influence on the light condensing power of the objective lens becomes a problem. However, when the shaping magnification is 0.85 or higher, the deterioration of the light condensing power is only small.

Moreover, in a structure having two optical systems that are different in wavelength and NA, the two optical systems share the collimator lens and the beam shaping element. This is advantageous in size, assembly and cost because an optical pickup having two optical systems can be easily structured while the above-mentioned advantages are obtained. Moreover, since the optical axis of the light beam elevated by the beam shaping element is the same between the two optical systems by the axes of incidence on the collimator lens and on the beam shaping element being different between the two optical systems, one objective lens can be shared by the optical systems and the axis serving as the reference of the tilt adjustment of the objective lens can be made the same between the two optical systems, so that the light condensation spot quality can be ensured for both of the optical systems.

Moreover, in the case of an optical system having two light sources, that is, a first light source and a second light source that are different in wavelength, a light transmitting parallel or nonparallel plate is disposed in a divergent system of the light beam from each of the light sources. This enables the astigmatism generated in each optical system to be independently corrected while the above-mentioned advantages are obtained, so that a high-performance optical pickup can be realized in which the quality of the light condensation spot formed by each of the optical systems is ensured.

A yet further aspect of the present invention is an optical pickup comprising:

a first light source that emits a first light beam;

light condensing means of condensing said first light beam from said first light source;

beam shaping means of shaping said first light beam condensed by said condensing means;

converging means of converging said first light beam shaped by said beam shaping means, on a first optical disk corresponding to said first light beam;

a second light source that emits a second light beam; and astigmatism providing means of providing a predetermined astigmatism to said second light beam from said second light source, wherein said second light source is disposed in a position such that the light beam it emits passes through said astigmatism providing means and is directed to said beam shaping means, said converging means converges said second light beam from said second light source on a second optical disk corresponding to said second light beam, said astigmatism providing means is disposed between said second light source and said beam shaping means, and a relationship between a position of said second light source and a position of said astigmatism providing means is such that an astigmatism for reducing an astigmatism generated when said second light beam passes through said beam shaping means is provided to said second light beam having passed through said astigmatism providing means.

A still yet further aspect of the invention shows generic contents of the invention.

An additional aspect of the present invention is an optical pickup comprising:

a first light source that emits a first light beam;

reflecting means of reflecting said first light beam from said first light source, said reflecting means being substantially a plane, light condensing means of condensing said first light beam reflected at said reflecting means;

beam shaping means of shaping said first light beam condensed by said light condensing means;

converging means of converging said first light beam shaped by said beam shaping means, on a first optical disk corresponding to said first light beam;

a second light source that emits a second light beam; and astigmatism providing means of providing a predetermined astigmatism to said second light beam from said second light source, wherein said reflecting means has a function of transmitting said second light beam, said second light source is disposed in a position such that the light beam it emits passes through said reflecting means and is directed to said light condensing means and said beam shaping means, said converging means converges said second light beam from said second light source on a second optical disk corresponding to said second light beam, said astigmatism providing means is disposed between said second light source and said reflecting means, and has a light incident surface and a light exit surface, said light exit surface and said reflecting means being substantially parallel to each other, and a relationship between a position of said second light source and a position of said light incident surface of said astigmatism providing means with respect to said reflecting means is such that an astigmatism for reducing an astigmatism generated when said second light beam passes through said beam shaping means is provided to said second light beam having passed through said astigmatism providing means.

A still additional aspect of the present invention is an optical pickup wherein said reflecting means and said light exit surface of said astigmatism providing means are in contact with each other, and said reflecting means and said astigmatism providing means are integrated with each other.

A yet additional aspect of the present invention is an optical pickup further comprising an optical element disposed between said second light source and said astigmatism providing means, wherein a relationship between a position of said second light source and a position of said light incident surface of said astigmatism providing means with respect to said reflecting means is such that an astigmatism for reducing an astigmatism of said second light beam based on said second light source and/or an astigmatism of said second light beam based on said optical element is provided to said second light beam having passed through said astigmatism providing means.

A still yet additional aspect of the present invention is an optical pickup comprising:

a first light source that emits a first light beam;

light condensing means of condensing said first light beam from said first light source;

beam shaping means having a function of shaping said first light beam condensed by said condensing means, and having a reflecting surface that reflects said first light beam;

converging means of converging said first light beam shaped and reflected by said beam shaping means, on a first optical disk corresponding to said first light beam;

a second light source that emits a second light beam; and astigmatism providing means of providing a predetermined astigmatism to said second light beam from said second light source, wherein said reflecting surface of said beam shaping means has a function of transmitting said second light beam;

said second light source is disposed in a position such that the light beam it emits passes through said beam shaping means and is directed to said converging means, said converging means converges said second light beam from said second light source on a second optical disk corresponding to said second light beam, said astigmatism providing means is disposed between said second light source and said beam shaping means, and has a light incident surface and a light exit surface, said light exit surface and said reflecting surface of said beam shaping means being substantially parallel to each other, and a relationship between a position of said second light source and a position of said light incident surface of said astigmatism providing means with respect to said reflecting surface of said beam shaping means is such that an astigmatism for reducing an astigmatism generated when said second light beam passes through said beam shaping means is provided to said second light beam having passed through said astigmatism providing means.

A supplementary aspect of the present invention is an optical pickup wherein said reflecting surface of said beam shaping means and said light exit surface of said astigmatism providing means are in contact with each other, and said beam shaping means and said astigmatism providing means are integrated with each other.

A still supplementary aspect of the present invention is an optical pickup further comprising an optical element disposed between said second light source and said astigmatism providing means, wherein a relationship of a position of said second light source and a position of said light incident surface of said astigmatism providing means with said reflecting surface of said beam shaping means is such that an astigmatism for reducing an astigmatism of said second light beam based on said second light source and/or an astigmatism of said second light beam based on said optical element is provided to said second light beam having passed through said astigmatism providing means.

A yet supplementary aspect of the present invention is an optical pickup comprising:

a first light source that emits a first light beam;

light condensing means of condensing said first light beam from said first light source;

beam shaping means of shaping said first light beam condensed by said condensing means;

converging means of converging said first light beam shaped by said beam shaping means, on a first optical disk corresponding to said first light beam;

a second light source that emits a second light beam; and reflecting means of reflecting said second light beam from said second light source and transmitting said first light beam, said reflecting means being integrally provided on a predetermined surface of said beam shaping means, wherein said converging means converges said second light beam from said second light source on a second optical disk corresponding to said second light beam.

A still yet supplementary aspect of the invention shows generic contents of subsequently described 16th and 17th inventions of the invention.

A further aspect of the invention shows generic contents of subsequently described 16th and 17th inventions of the invention.

a first light source that emits a first light beam;

light condensing means of condensing said first light beam from said first light source;

beam shaping means of shaping said first light beam condensed by said condensing means, and transmitting said first light beam;

converging means of converging said first light beam shaped by said beam shaping means and transmitted by said beam shaping means, on a first optical disk corresponding to said first light beam;

a second light source that emits a second light beam; and reflecting means of reflecting said second light beam from said second light source and transmitting said first light beam, said reflecting means being disposed on a surface of said beam shaping means from which said first light beam exits, wherein said converging means converges said second light beam from said second light source on a second optical disk corresponding to said second light beam.

Still another aspect of the present invention is an optical pickup comprising:

a first light source that emits a first light beam;

light condensing means of condensing said first light beam from said first light source;

beam shaping means of shaping said first light beam condensed by said condensing means, and reflecting said first light beam;

converging means of converging said first light beam shaped and reflected by said beam shaping means, on a first optical disk corresponding to said first light beam;

a second light source that emits a second light beam; and reflecting means of reflecting said second light beam from said second light source and transmitting said first light beam, said reflecting means being disposed on a surface of said beam shaping means on and from which said first light beam is incident and exits, wherein said converging means converges said second light beam from said second light source on a second optical disk corresponding to said second light beam.

Yet another aspect of the present invention is an optical pickup wherein said first light beam emitted from said first light source and said second light beam emitted from said second light source are different in wavelength.

Still yet another aspect of the present invention is an optical pickup wherein said beam shaping means also has a function of correcting chromatic aberration of said first light beam from said first light source.

Figure 1:
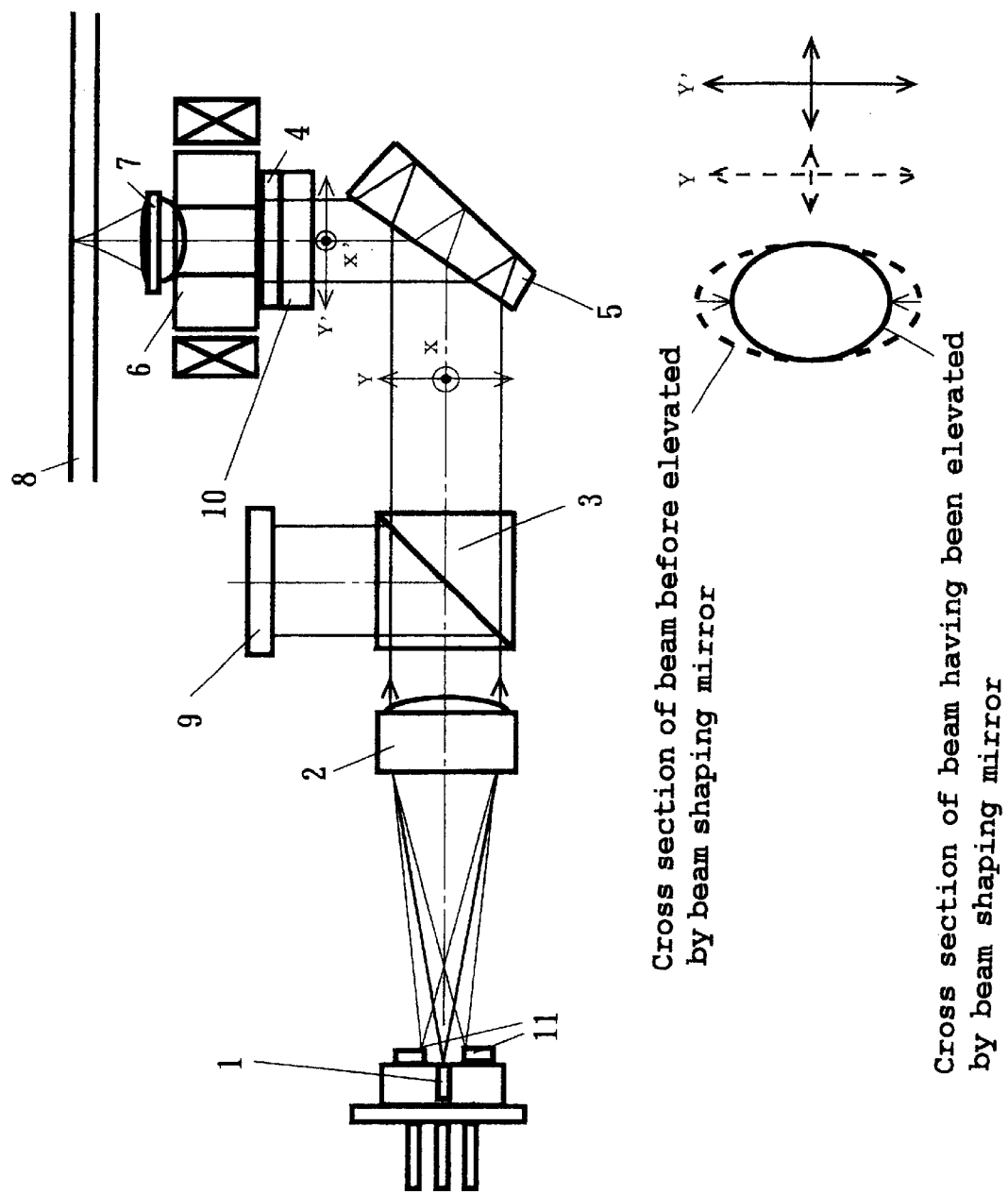
FIG. 1 is a schematic view of an optical system of an optical pickup according to a first embodiment of the present invention.

Explanation of Reference Numerals 1, 31, 51, 62, 71 Semiconductor laser
2, 32, 52 Collimator lens
3, 33 Mirror
4, 34 λ/4 plate
5, 35, 55 Beam shaping mirror
6, 36, 56 Actuator movable member
7, 37, 57 Objective lens
8, 38, 58 Optical disk
9, 39, 66 Monitoring detector (Photodetector)
10, 40, 53 Polarization hologram (Polarizing hologram)
11, 41, 63 Photodetector
54 Wave plate
59, 79 Dichroic prism
60 Color filter
64 Glass hologram
65 Concave mirror (Front light mirror)
85 Parallel plate
86 Nonparallel plate
1001 First module
1001a Semiconductor laser of the first module
1001b Photodetector of the first module
1001c Hologram of the first module
1002 Light beam
1003 AS correcting prism
1004 Optical film
1005 Condensing lens
1006 Beam shaping prism
1007 Aperture limiting means
1008 Objective lens
1009 Optical disk
1010 Light spot
1011 Light beam (on the way to the disk)
1012 Light beam (on the way back from the disk)
1013 Second module
1013a Semiconductor laser of the second module
1013b Photodetector of the second module
1013c Hologram of the second module
1014 Light beam (on the way to the disk)
1015 Optical disk
1016 Light spot
1017 Light beam (on the way back from the disk)
1018 Light beam
1019 Condensing lens (DVD side)
1020 Condensing lens (CD side)
1021 Compound prism
1021a Beam shaping prism
1021b AS correcting prism
1021c Optical film
1022 Totally reflecting mirror
1023 Light beam (on the way to the disk)
1024 Light spot
1025 Light beam (on the way to the disk)
1026 Light beam (on the way back from the disk)
1027 Light spot
1029 Beam shaping prism
1029a Optical film
1030 Light beam (on the way to the disk)
1031 Light beam (on the way back from the disk)
1032 Light spot
1033 Light beam (on the way to the disk)
1034 Light beam (on the way back from the disk)
1035 Light spot
1036 Beam shaping prism
1036a Optical film
1036b Totally reflecting film
1037 Light beam (on the way to the disk)
1038 Condensing lens
1039 Beam shaping prism
1040 Compound prism
1040a Optical film
1041 Totally reflecting mirror
1042 Aperture limiting means
1043 Objective lens
1044 Optical disk
1045 Light spot
1046 Light beam (on the way back from the disk)
1047 Second module
1047a Semiconductor laser of the second module
1047b Photodetector of the second module
1047c Hologram of the second module
1048 Condensing lens
1049 Light beam (on the way to the disk)
1050 Optical disk
1051 Light spot
1052 Light beam (on the way back to the disk)
1060 First module
1060a Semiconductor laser
1060b Photodetector
1060c Hologram

DESCRIPTION OF THE PREFERRED EMBODIMENTS

Hereinafter, embodiments of the present invention will be described with reference to FIGS. 1 to 19.

First Embodiment

FIG. 1 is a view showing a structure example of an optical pickup according to a first embodiment of the present invention. Detailed description of elements performing similar functions to those of the conventional example is omitted. In FIG. 1, a divergent light beam emitted from a high-power semiconductor laser 1 is condensed by a collimator lens 2, and is partly reflected at the mirror 3 to be incident on a photodetector 9 that monitors the emission power of the semiconductor laser 1.

On the other hand, the light beam transmitted by the mirror 3 is refractively incident on a beam shaping mirror 5 comprising a transparent nonparallel plate, and is elevated by being reflected at the rear surface of the mirror 5. Then, the light beam passes through a polarizing hologram 10 provided on an actuator movable member 6, is converted into circularly polarized light by a λ/4 plate 4, is aperture-limited by an objective lens attachment hole of the actuator movable member 6, and is condensed on the signal surface of an optical disk 8 by an objective lens 7.

The light reflected at the signal surface of the optical disk 8 passes through the objective lens 7 and the λ/4 plate 4 to be converted into linearly polarized light orthogonal to the path on the way to the optical disk 8, and is diffractively branched by the polarizing hologram 10. The diffractively branched light beam passes through the beam shaping mirror 5, the mirror 3 and the collimator lens 2, and is directed to a photodetector 11 integrated with the laser light source 1. By use of variations in the quantity of this light, a servo signal and an RF signal can be obtained.

The beam shaping mirror 5 will be described. The cross section of the light beam emitted from the semiconductor laser 1 has an elliptical far field pattern having its major axis in the direction of the Y axis as shown by the broken line in FIG. 1, and by appropriately selecting the elevation angles of the incident surface and the reflecting surface with respect to the optical axis of incidence on the beam shaping mirror 5, and the refractive index of the glass material, the beam is substantially vertically elevated and beam shaping is performed in a direction that compresses the beam in the direction of major axis of the far field pattern.

Consequently, the far field pattern of the light elevated by the beam shaping mirror 5 has a distribution compressed only in the direction of the Y' axis as shown by the solid line in FIG. 1. This means that at a fixed aperture limitation, the quantity of the light within the aperture is relatively large compared to a case where the light beam is elevated by the surface reflection mirror shown in the conventional example, so that the light use efficiency of the optical system is enhanced. In addition, since the beam shaping element 5 also performs the function as the elevating mirror, the number of parts of the optical system does not increase.

While in the above-described first embodiment, the light beam of the far field pattern from the semiconductor laser 1 is compressed only in the direction of the Y' axis shown in FIG. 1 so that the cross section of the light beam having passed through the beam shaping mirror 5 is close to a circle, the light beam in a direction orthogonal to the Y' axis may be extended so that the cross section of the light beam having passed through the beam shaping mirror 5 is close to a circle. In any case, the light use efficiency is enhanced by making the cross section of the light beam having passed through the beam shaping mirror 5 close to a circle.

As a method of extending the light beam in the direction orthogonal to the Y' direction so that the cross section of the light beam having passed through the beam shaping mirror 5 is close to a circle, for example, a method of rotating the semiconductor laser 1 90 degrees with respect to the optical axis maybe used. Moreover, a method of rotating the beam shaping mirror 5 180 degrees with respect to the optical axis may be used. That is, a method maybe used of interchanging the narrower part of the beam shaping mirror 5 farther away from the optical disk 8 in FIG. 1 and the wider part thereof closer to the optical disk 8 in FIG. 1 to change the disposition of the beam shaping mirror 5.

Moreover, the above-mentioned method of extending the light beam in a direction orthogonal to the Y' direction so that the cross section of the light beam having passed through the beam shaping mirror 5 is close to a circle may be used in second to fourth embodiments described later.

Even in the case where the light beam in a direction orthogonal to the Y' direction is extended so that the cross section of the light beam having passed through the beam shaping mirror 5 is close to a circle as mentioned above, since the beam shaping mirror 5 in that case also performs the function as the elevating mirror, the number of parts of the optical system does not increase.

Second Embodiment

Figure 2:
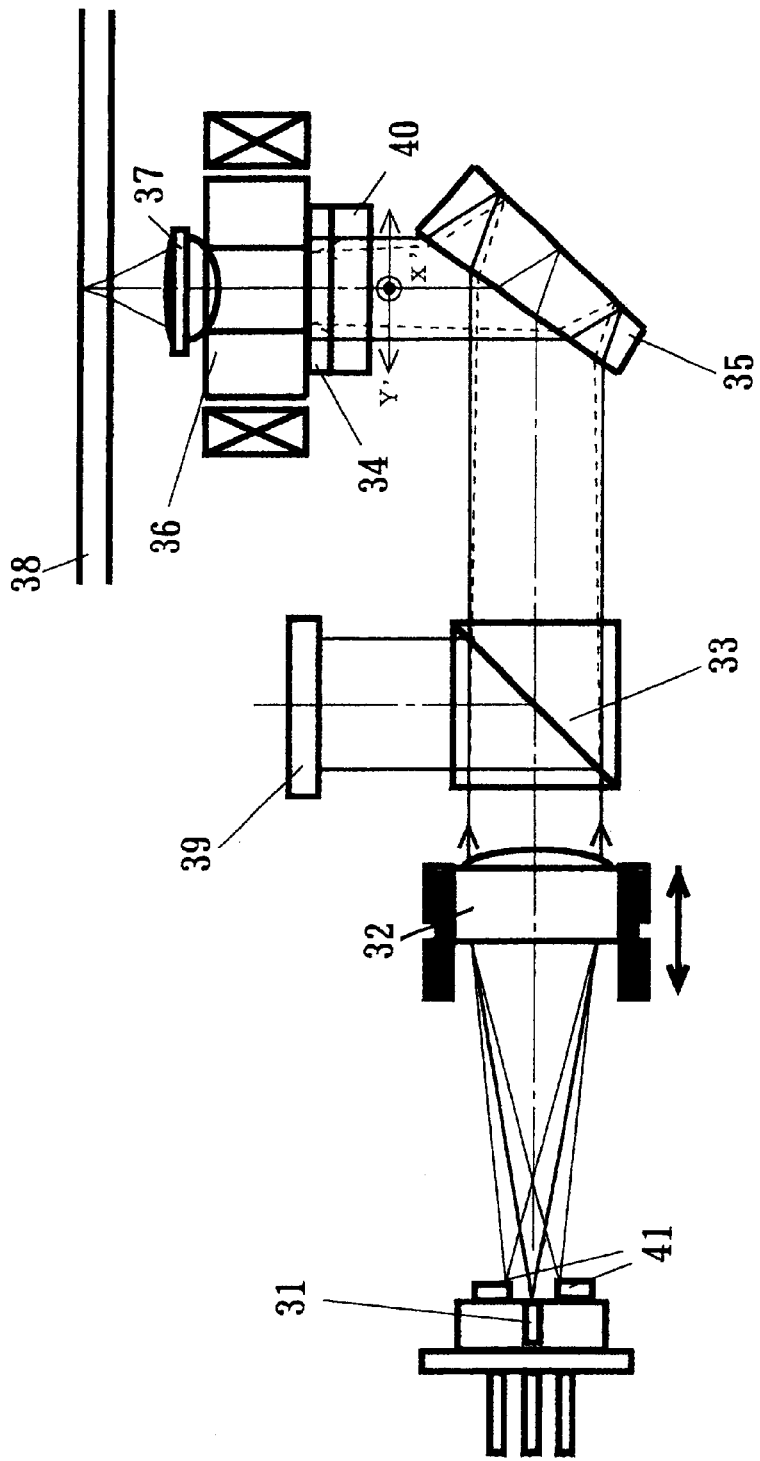
FIG. 2 is a schematic view of an optical system of an optical pickup according to a second embodiment of the present invention.

FIG. 2 is a schematic view showing the structure of an optical pickup according to the second embodiment of the present invention. Since the structure is substantially the same as that of the first embodiment, detailed description thereof is omitted. This embodiment is different from the first embodiment in that a collimator lens 32 is structured so as to be slightly movable in the direction of the optical axis.

The embodiment of FIG. 2 has an adjusting mechanism that moves the collimator lens 32 in the direction of the optical axis, and since the movement of the collimator lens 32 varies the relative distance between the light emission point of a semiconductor laser 31 and the principal plane of the collimator lens 32, the curvature of spherical wave of the light beam condensed by the collimator lens 32 continuously changes according to the amount of the movement.

Generally, by a spherical wave passing through a beam shaping prism comprising a nonparallel plate, an astigmatism in the xy direction of FIG. 2 is generated in the optical system. By setting, by rather using this, the movement direction and the movement amount of the collimator lens 32 so that astigmatisms immanent in the optical system are corrected, aberrations are eliminated, so that excellent spot quality is ensured.

Astigmatisms in the optical system are generated in directions other than the xy direction of FIG. 2. However, since the influence of the astigmatisms generated in the direction of radius (radial direction) and the direction of tangential line (tangential direction) of the disk on the characteristic, deterioration is great, by making these directions and the xy direction of FIG. 2 coincide with one another, a sufficient effect is obtained even when the correction direction is limited.

Figure 3:
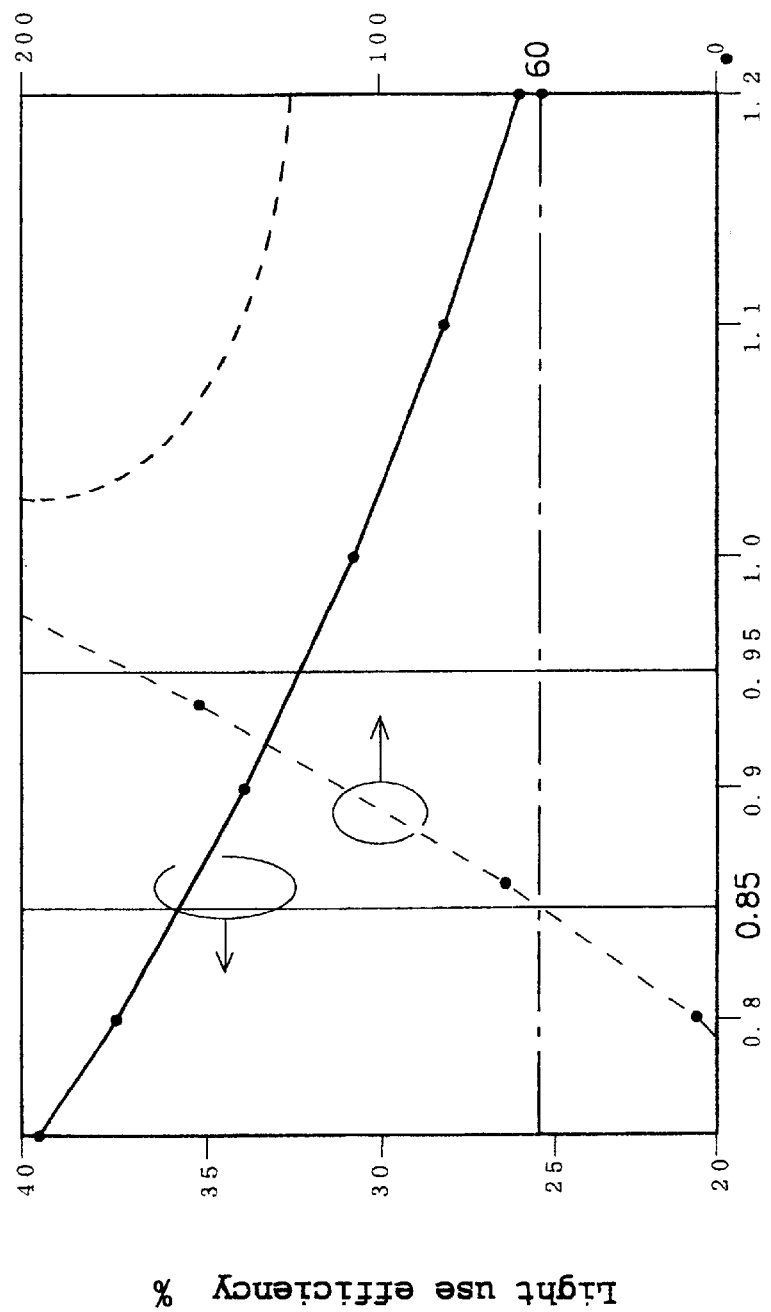
FIG. 3 is a view showing a relationship between a beam shaping magnification and the light use efficiency of the optical system and a relationship between the beam shaping magnification and the movement amount of a collimator lens necessary for generating an astigmatism of 30 m$\lambda$ in the second embodiment of the present invention.

FIG. 3 is a view showing a relationship between the beam shaping magnification of a beam shaping element 35 and the light use efficiency of the optical system (plotted by the solid line) and a relationship between the beam shaping magnification and the movement amount of the collimator lens 32 necessary for generating an astigmatism of 30 mλ (plotted by the broken line), for example, in FIG. 2. Here, the beam shaping magnification represents the ratio-between the diameter in the major axis direction of the beam having been elevated and the diameter in the major axis direction of the beam before elevated, and a case where the beam shaping magnification is 1 is a case where the beam is elevated by a normal surface reflection mirror or a transparent parallel plate. While the optical parts constituting the optical system each cause an astigmatism and the astigmatisms caused by the optical parts are accumulated, since it is considered that the overall amount of astigmatisms caused in the optical system is not more than 30 mλ at the maximum, the astigmatism of 30 mλ is taken up. Therefore, an aberration that curbs the astigmatism of 30 mλ at the maximum is generated in the collimator lens 32.

When the light beam from the semiconductor laser 1 is compressed, to enhance the light use efficiency, the lower the beam shaping magnification, the more advantageous as shown by the solid line of FIG. 3. As the light use efficiency, an improvement amount of not less than approximately 2% is desirably obtained as a significant amount. Therefore, it is desirable that the beam shaping magnification be not more than 0.95.

However, when the beam shaping magnification is low, the astigmatism generation amount with respect to the movement amount of the collimator lens 32 is large as shown by the broken line. This means that when the astigmatism correction is made by moving the collimator lens 32, to increase the adjustment accuracy, it is necessary to make a severer adjustment.

Further explaining, from the broken line of FIG. 3, the higher the beam shaping magnification is, the larger the movement amount of the collimator lens 32 for generating the astigmatism of 30 mλ is, and the easier it is to control the movement amount of the collimator lens 32 that is moved in accordance with the magnitude of the astigmatism. For example, when the beam shaping magnification is approximately 0.95, the movement amount of the collimator lens 32 for generating the astigmatism of 30 mλ is approximately 180 μm, and when the beam shaping magnification is approximately 0.85, the movement amount of the collimator lens 32 for generating the astigmatism of 30 mλ is approximately 60 μm. For example, in a case where the collimator lens 32 is moved by 10 μm, when the beam shaping magnification is approximately 0.95, an astigmatism of only not more than 2 m λ is generated, but when the beam shaping magnification is approximately 0.85, an astigmatism of approximately 5 mλ is generated. Therefore, the higher the beam shaping magnification is, the easier the adjustment of the movement amount of the collimator lens 32 for the generated astigmatism is.

When the beam shaping magnification is not less than 0.85 like in FIG. 3, the movement amount of the collimator lens 32 necessary for correcting the astigmatism of 30 mλ is approximately 60 μm, and a correction sensitivity is obtained that makes the amount of astigmatism not more than 5 mλ at an adjustment accuracy of 10 μm. Moreover, when the beam shaping magnification is low, the spot diameter is large, which results in deterioration such as cross talk or cross erase for recording and reproduction of highly dense signals. Therefore, it is desirable that there be hardly any variation in spot diameter. When the beam shaping magnification is not less than 0.85, the spot diameter variation is approximately not more than 3/1000 μm. Thus, the beam shaping magnification of not less than 0.85 is a level that causes no problem also in this point.

By setting the beam shaping magnification within a range of 0.85 to 0.95, improvement in light use efficiency, astigmatism amount correction sensitivity, and light condensing power are all established.

Third Embodiment

Figure 4:
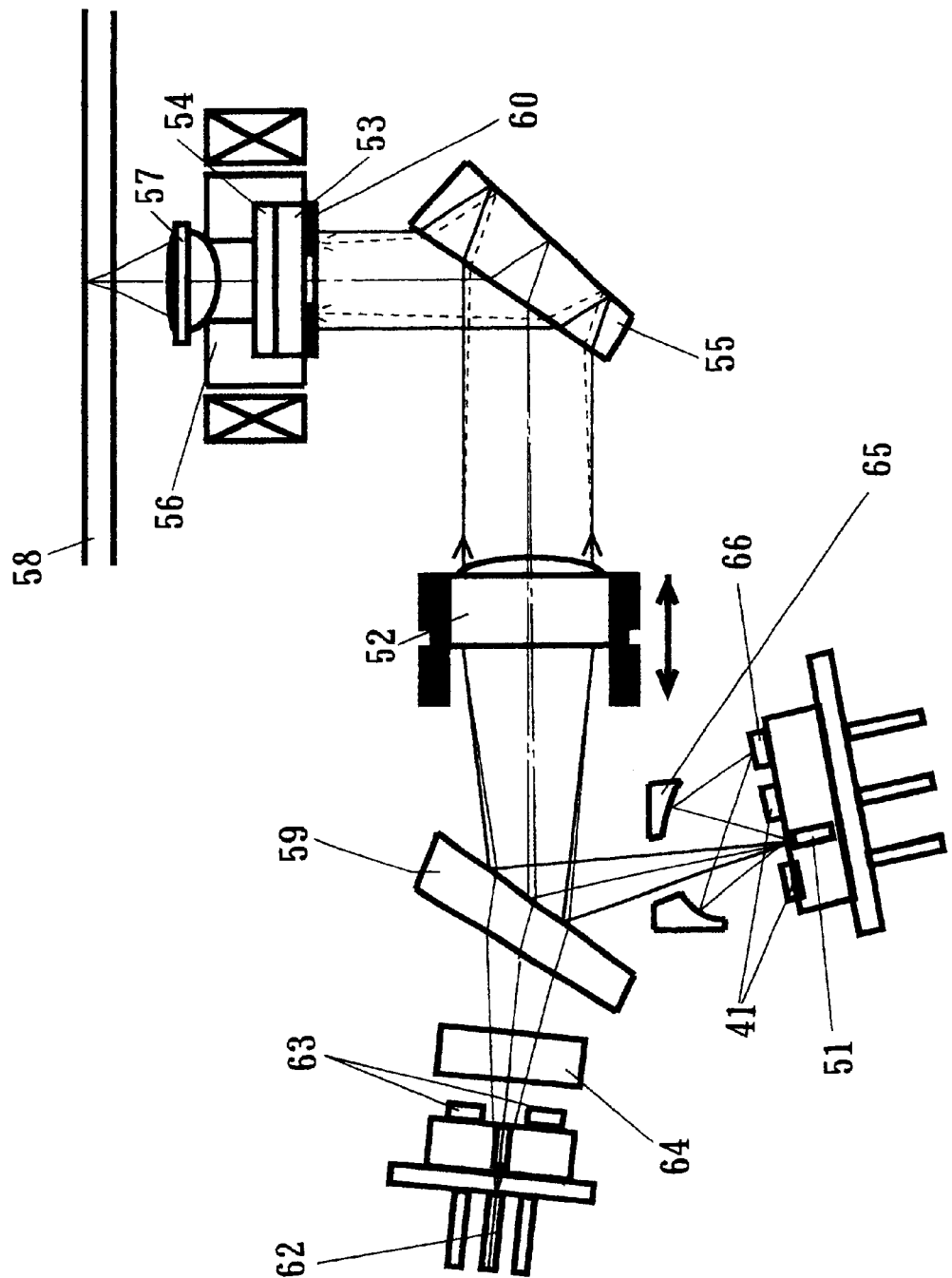
FIG. 4 is a schematic view of an optical system of an optical pickup according to a third embodiment of the present invention.

FIG. 4 is a schematic view of an optical pickup according to the third embodiment of the present invention. In this embodiment, the optical pickup has two optical systems that are different in wavelength and NA and share one objective lens and one collimator lens.

A laser beam emitted from a semiconductor laser 51 of a wavelength λ1 is surface-reflected at a dichroic prism 59 having a wavelength selective optical multilayer film on the surface thereof, and is converted into a substantially parallel beam by a collimator lens 52. This beam is refractively incident on a beam shaping mirror 55 comprising a nonparallel plate, and is reflected at a reflecting surface to be elevated toward an objective lens 57.

The elevated beam is incident on a polarizing hologram 53 attached to an actuator movable member 56, is converted into circularly polarized light by a wave plate 54 corresponding substantially to a 5/4 wave plate for the wavelength λ1, is aperture-limited by the actuator movable member 56, and is then condensed on the surface of an optical disk 58 by the objective lens 57. On the surface of the substrate of the polarizing hologram 53, a color filter 60 comprising a wavelength selective thin film is zonally formed, and the light of the wavelength λ1 is transmitted by the color filter 60 without influenced by the color filter 60.

The light reflected at the optical disk 58 takes a reverse path and is diffractively branched by the polarizing hologram 53 like in the conventional example, and a servo signal and an RF signal are obtained by a photodetector 41 disposed adjacent to the semiconductor laser 51. Of the light beam emitted from the semiconductor laser 51, an outer part is reflected at a hollow concave mirror 65 to be condensedly input to a photodetector 66, and is used as a power monitor for the semiconductor laser 51.

A light beam emitted from a semiconductor laser 62 of a wavelength λ2 is partly diffractively branched by a glass hologram 64, is transmitted by the dichroic prism 59 this time, and is converted into a divergent beam close to a parallel beam by the collimator lens 52. The dichroic prism 59 comprises a nonparallel plate, and by optimizing the elevation angle of the nonparallel plate with respect to the optical axis and the thickness of the nonparallel plate, astigmatisms generated in an optical system using the wavelength λ2 are corrected.

This light beam is elevated by the beam shaping mirror 55, and is aperture-limited by the color filter 60 this time, so that only an inner part of the light beam (that is, a part of the light beam in a low-NA region) is transmitted by the polarizing hologram 53. The transmitted part of the light beam is transmitted by the wave plate 54, and by the wavelength λ2 and the wavelength λ1 of the other laser satisfying the relationship of the following expression (3), the wave plate 54 is a substantially one wave plate for light of the wavelength λ2, and the light beam is transmitted without undergoing the polarization conversion by the wave plate 54:

$$5/4\lambda 1 \approx \lambda 2 \quad (3)$$

Generally, the wavelength of lasers used for recording and reproduction onto and from media such as DVDs is approximately 650 nm, and the wavelength of lasers used for reproduction from media such as CDs is 790 nm. Therefore, in such cases, the relationship of the expression (3) is substantially satisfied.

The light beam transmitted by the wave plate 54 is condensed on the optical disk 58 by the objective lens 57, and the reflected light beam which is in the same polarization condition as the light beam on the way to the optical disk 58 is transmitted by the wave plate 54 and the polarizing hologram 53 without its condition changed. Thereafter, the light beam takes a path reverse to the path on the way to the optical disk 58 and is diffractively branched by the glass hologram 64, and a servo signal and an RF signal are obtained by a photodetector 63 formed adjacent to the semiconductor laser 62.

The base material thicknesses of the media onto and from which recording and reproduction are performed by the laser light sources are different. For example, an infinite system is used as the optical system using the semiconductor laser 51, a finite system is used as the optical system using the semiconductor laser 62, and the positions of the light sources and the collimator lens 52 are designed so that the degree of the spherical waves of the optical systems is appropriate, whereby spherical aberration caused by the difference in base material thickness can be corrected.

Color dispersion of the glass material of the beam shaping element 55 causes a difference in refraction angle when light beams of different wavelengths pass through the beam shaping element 55. However, since the optical axes, of incidence on the collimator lens 52 and the beam shaping element 55, of the light beams from the light sources can be made to coincide with the optical axes of the light beams elevated by the beam shaping element 55 as shown in FIG. 4 by setting the angle of incidence on the collimator lens 52 to substantially 90 degrees and the angle of incidence on the beam shaping element 55 to θ1 in the optical system using the light source 62, setting the angle of incidence on the collimator lens 52 to θ2 (≠90 degrees) and the angle of incidence on the beam shaping prism 55 to θ3 in the optical system using the light source 51, and optimizing the values, the optical axes of the optical systems can be made to coincide with the axis of one objective lens 57.

Further, by moving the collimator lens 52 along the optical axis, aberrations in the higher-NA optical system for reproduction of highly dense signals can be corrected. In this case, although astigmatism is generated in the other optical system, since the NA is low, the variation in astigmatism for the movement of the collimator lens 52 is minor, and the amount of astigmatism is small when the beam shaping rate m is within the range of 0.85<m<0.95.

Fourth Embodiment

Figure 5:
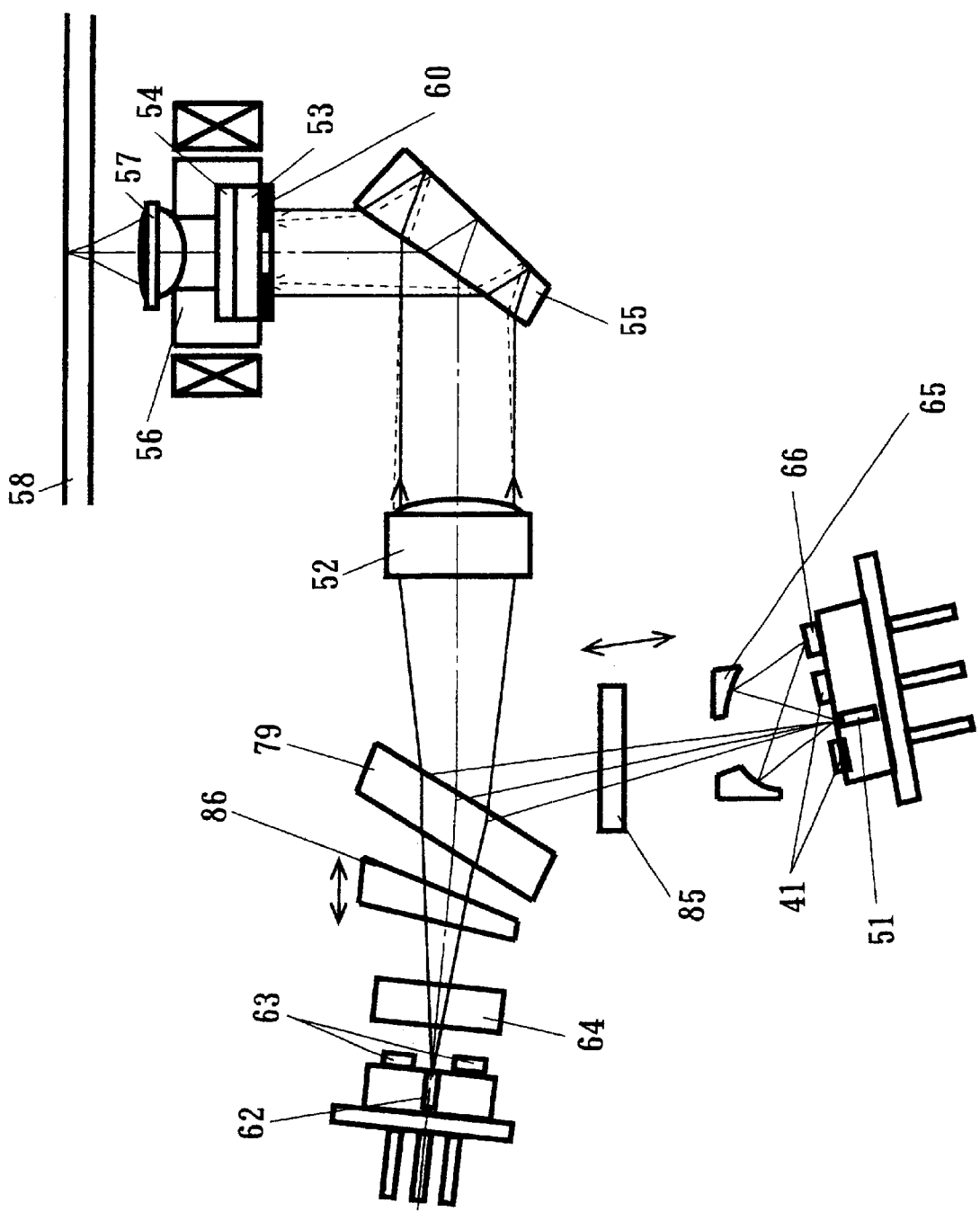
FIG. 5 is a schematic view of an optical system of an optical pickup according to a fourth embodiment of the present invention.

FIG. 5 shows an example of a structure in which in the optical systems of the optical pickup shown in FIG. 4, by inserting a parallel plate 85 and a nonparallel plate 86 so as to be inclined in divergent systems of the light beams emitted from the laser light sources, astigmatism correction can be independently made in the optical systems. In FIG. 5, by disposing the parallel plate 85 so as to be inclined in the divergent system of the light beam emitted from the semiconductor laser 51, and slightly moving the parallel plate 85 in the direction of the optical axis, fine adjustment of the astigmatism in the optical system using the semiconductor laser 51 can be made.

On the other hand, by disposing the nonparallel plate 86 in the divergent system of the light beam emitted from the semiconductor laser 62, and slightly moving the nonparallel plate 86 in the direction of the optical axis, the astigmatism in the optical system using the semiconductor laser 62 can be corrected. Moreover, since this enables use of a parallel plate as a dichroic prism 79, the cost of the parts can be reduced.

As described above, fine adjustment of the astigmatisms in the two optical systems that are different in wavelength and NA can be independently made by the structure of FIG. 5, so that the light condensation spot qualities thereof can be further improved.

In the fourth embodiment, in the divergent system of the light beam emitted from the semiconductor laser 51, the parallel plate 85 is disposed so as to be inclined with respect to the axis of the light beam, and in the divergent system of the light beam emitted from the semiconductor laser 62, the nonparallel plate 86 is disposed. However, the nonparallel plate 86 may be disposed in the divergent system of the light beam emitted from the semiconductor laser 51, and the parallel plate 85 may be disposed in the divergent system of the light beam emitted from the semiconductor laser 62. Moreover, the parallel plate 85 may be disposed in both the divergent system of the light beam emitted from the semiconductor laser 51 and the divergent system of the light beam emitted from the semiconductor laser 62, or the nonparallel plate 86 may be disposed in both of the divergent systems. In short, it is necessary only that a nonparallel plate or a parallel plate disposed with respect to the optical axis be disposed in the divergent systems of the optical systems, whereby astigmatism correction can be independently made in the optical systems.

By using the pickups of the above-described embodiments, in recording and reproduction onto and from an optical disk, the loss of transmission efficiency can be reduced by increasing the quantity of light passing through the aperture. Further, since the astigmatisms generated in the optical systems of the head can be corrected by an adjustment of only one axis in which the collimator lens is moved in the direction of the optical axis, the embodiments are advantageous in recording and reproduction-type pickups requiring high spot quality. Moreover, by limiting the range of the beam shaping magnification to from 0.85 to 0.95, the astigmatism variation sensitivity for the movement of the collimator lens can be made appropriate, and the transmission efficiency can be significantly enhanced while the deterioration of the light condensing power is a level that causes no problem. Moreover, the embodiments are applicable to a head having two optical systems that are different in wavelength and NA and share one collimator lens and one objective lens, and size reduction and cost reduction of the optical head can be achieved.

Fifth Embodiment

Figure 6:
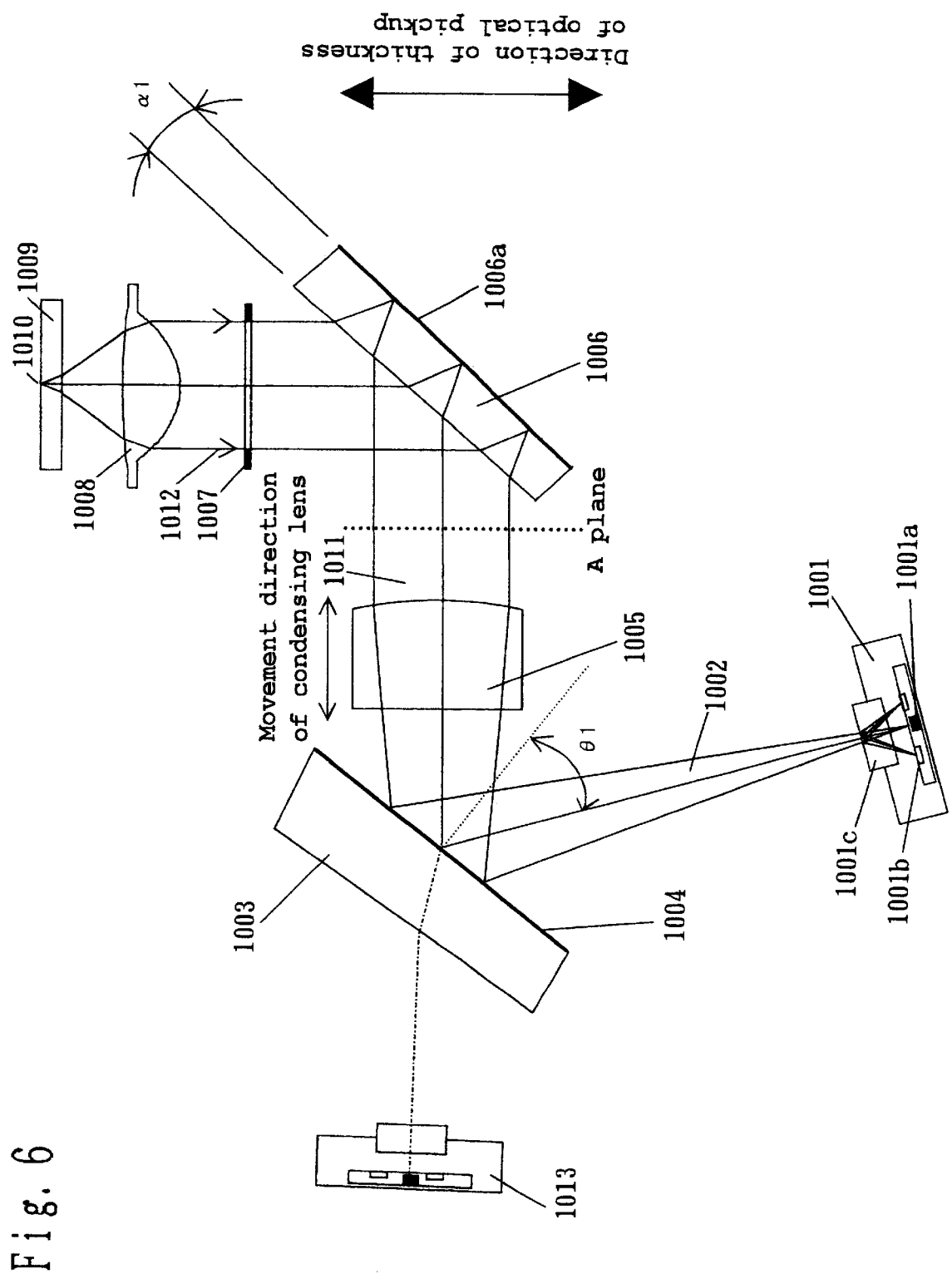
FIG. 6 is a view showing the structure of an optical pickup according to a fifth embodiment of the present invention.
Figure 7:
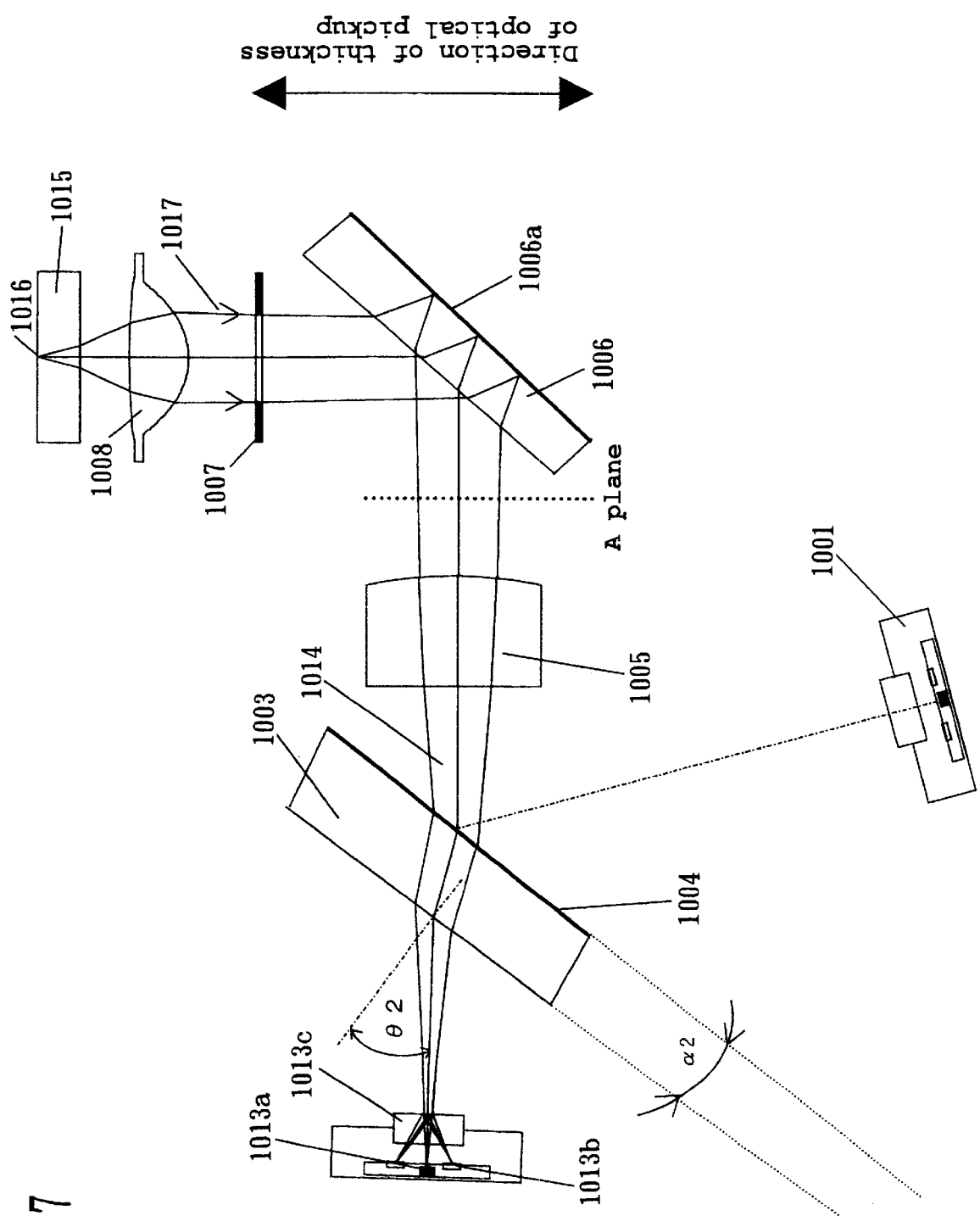
FIG. 7 is a view showing the structure of the optical pickup according to the fifth embodiment of the present invention.

FIGS. 6 and 7 are views showing the structure of an optical pickup according to a fifth embodiment of the present invention. FIG. 6 shows a case where a high-density optical disk 1009 with a base material thickness of 0.6 mm is reproduced in this embodiment. FIG. 7 shows a case where an optical disk 1015 with a base material thickness of 1.2 mm is reproduced. In these figures, since the structure of each optical pickup is two-dimensionally shown, the direction in which the light beam is decentered at a beam shaping prism 1006, which direction is actually vertical to the plane of the figures, is rotated 90 degrees about the center of the optical axis on the A plane in the figures. This applies to the figures described later.

In FIG. 6, a first module 1001 for reproduction from DVDs comprises the following elements integrated with one another: a semiconductor laser 1001a of a wavelength of 650 nm; a hologram 1001c that disperses the light beam reflected from the optical disk 1009 to provide the light beam with a spatial change; and a photodetector 1001b that receives the reflected light. The positions of the photodetector 1001b and the hologram 1001c are previously adjusted when the module is assembled. While the element that separates the light beam reflected from the optical disk is a hologram in this embodiment, a different optical element such as a prism may be used to obtain a similar effect.

An optical film 1004 shown in FIG. 6 comprises a multilayer film that totally reflects light of wavelengths in the vicinity of 650 nm and transmits light of wavelengths in the vicinity of 780 nm.

A light beam 1002 is incident on an AS correcting prism 1003 at an angle θ1, and is reflected at the optical film 1004. Then, the light beam 1002 is converted into a parallel or substantially parallel light beam 1011 by a condensing lens 1005, and is incident on the beam shaping prism 1006. The second surface of the beam shaping prism 1006 comprises totally reflecting film 1006a. The beam shaping prism 1006 is an optical element in which the first surface and the second surface are at an angle α1 as shown in FIG. 6, that is, an optical element in which the first surface and the second surface are nonparallel to each other.

Figure 8:
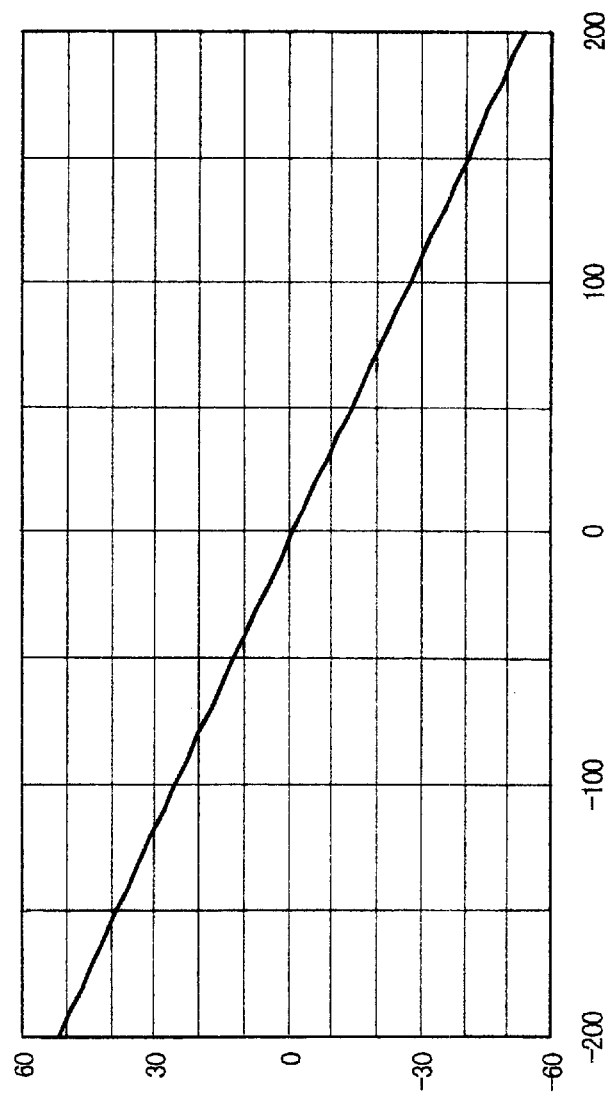
FIG. 8 is a graph showing the amount of variation in astigmatism when the condensing lens is moved in the fifth embodiment of the present invention.

By moving the condensing lens 1005 in the direction of the arrow "movement direction of condensing lens" shown in FIG. 6, the parallelism of the light beam 1011 varies. Assuming that the focal length and the NA of an objective lens 1008 are 3.0 mm and 0.6, respectively, and the focal length of the condensing lens 1005 is 20.0 mm, the astigmatism varies in the radial direction and the tangential direction on a spot on the disk (varies in directions horizontal and vertical to the p-n junction surface of the laser) as shown in the graph of FIG. 8. By this aberration variation, the astigmatism in each optical element for the semiconductor laser 1001a can be corrected.

Figure 9:
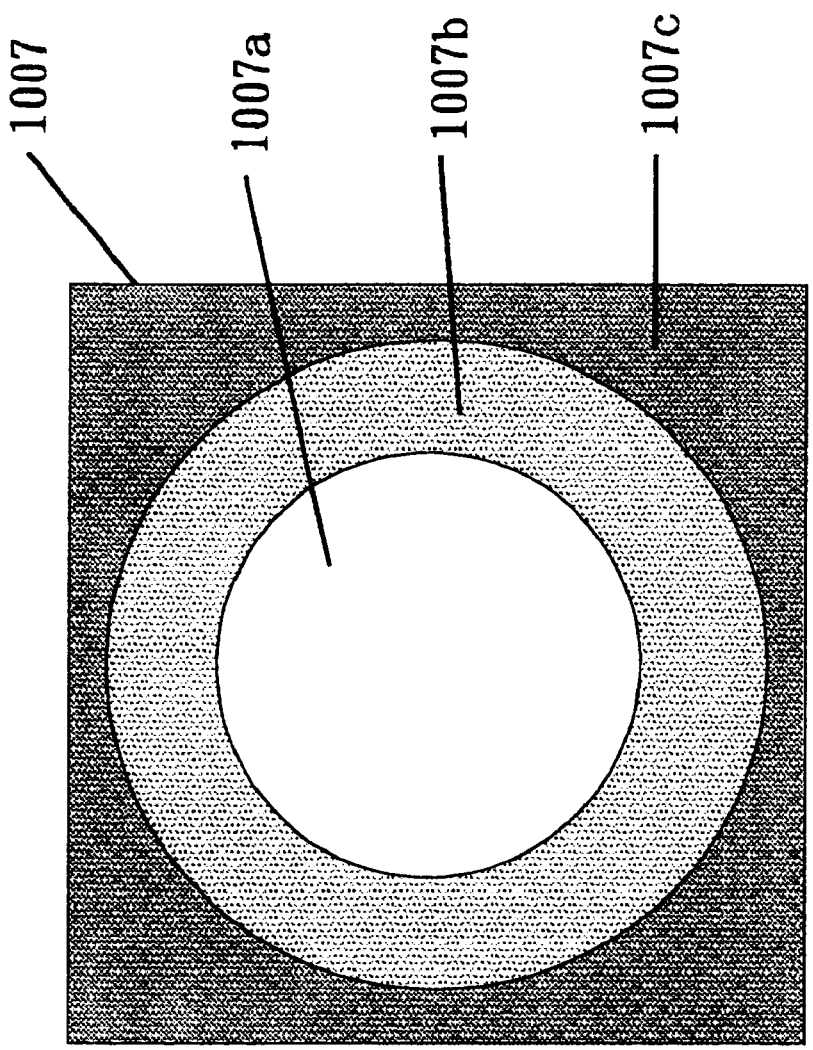
FIG. 9 is an explanatory view of aperture limiting means in the fifth embodiment of the present invention.

Then, the light beam 1011 transmitted and reflected by the beam shaping prism 1006 is incident on aperture limiting means 1007. On the aperture limiting means 1007, an optical multilayer film is formed in which the inner part and the outer part have different characteristics as shown in FIG. 9. In the inner part, a first optical multilayer film 1007a is provided, and in the outer part, a second optical multilayer film 1007b is provided. These films 1007a and 1007b are different in thickness and the number of layers.

The first optical multilayer film 1007a is structured so as to transmit both light of a wavelength of 650 nm and light of a wavelength of 780 nm, and the second optical multilayer film 1007b is structured so as to transmit light of a wavelength of 650 nm and reflect light of a wavelength of 780 nm. A completely intercepting film 1007c is further provided outside so that light of any wavelength is intercepted. Therefore, the light beam 1011 of a wavelength of 650 nm which is transmitted by both the optical multilayer film 1007a and the optical multilayer film 1007b can pass through the aperture limiting means 1007 with hardly any optical loss. In order that high-density optical disks such as DVDs can be handled, the numerical aperture of the completely intercepting film 1007c is 0.6.

The light beam 1011 having passed through the aperture limiting means 1007 and incident on the objective lens 1008 is converged with a numerical aperture of 0.6, and forms a light spot 1010 on the recording surface of the optical disk 1009 with a base material thickness of 0.6 mm. Then, a light beam 1012 reflected at the optical disk 1009 again passes through the objective lens 1008 and the aperture limiting means 1007, and is incident on the beam shaping prism 1006. The light beam 1012 is again shaped by the beam shaping prism 1006, is converged by the condensing lens 1005, and is incident on the AS correcting prism 1003.

The light beam 1012 of a wavelength of 650 nm is reflected at the optical film 1004 formed on the AS correcting prism 1003, and is incident on the first module 1001. The light beam 1012 incident on the first module 1001 is diffracted at the hologram 1001c, and is incident on the photodetector 1001b to detect a focus control signal for causing the objective lens 1008 to follow the recording surface by use of the SSD method and a tracking control signal for causing the objective lens 1008 to follow the tracks on the track surface by use of the phase difference method.

A second module 1013 for reproduction from CDs comprises the following elements integrated with one another: a semiconductor laser 1013a of a wavelength of 780 nm; a hologram 1013c that separates the light beam reflected from the optical disk 1015 to provide the light beam with a spatial change; and a photodetector 1013b that receives the reflected light. The second module 1013 has a similar structure to the first module 1001 for reproduction from DVDs.

In the case of reproduction from CDs, since the base material thickness of the optical disk 1015 is 1.2 mm, when a light beam 1014 having passed through the condensing lens 1005 is incident on the objective lens 1008 as a parallel beam, the light spot 1016 thereof has a very large spherical aberration, so that the spot quality is degraded. Therefore, by causing the light beam 1014 having passed through the condensing lens 1005 to be slightly divergent when incident on the objective lens 1008, the spherical aberration of the light spot can be corrected.

However, by the light beam 1014 passing through the beam shaping prism 1006 as a divergent beam, astigmatism is very large, so that the spot quality is degraded. Therefore, by using, as light integrating means of integrating the light beam 1002 emitted from the first module 1001 and the light beam 1014 emitted from the second module 1013, the AS correcting prism 1003 in which the first surface and the second surface are at an angle α2 instead of the compound prism as shown in FIG. 7, an astigmatism of an inverse component is generated to thereby eliminate the astigmatism on the light spot, so that an excellent spot quality is obtained.

In FIG. 7, the light beam 1014 of a wavelength of 780 nm emitted from the second module 1013 passes through the hologram 1013c, and is incident on the AS correcting prism 1003 at the angle θ2. By the light beam 1014 passing through the AS correcting prism 1003, astigmatism is added to the light beam 1014, and thereafter, the light beam 1014 is converted into a slightly divergent beam by the condensing lens 1005. Although astigmatism is generated in the light beam 1014 by the light beam 1014 passing through the beam shaping prism 1006, this astigmatism is canceled by the astigmatism added by the AS correcting prism 1003, so that there is hardly any aberration in the light beam 1014.

Then, only an inner part of the light beam 1014 corresponding to a numerical aperture of 0.45 is transmitted by the aperture limiting means 1007, is incident on the objective lens 1008, and forms a light spot 1016 on the recording surface of the optical disk 1015. By the light beam 1014 being incident on the objective lens 1008 as a divergent system and aperture-limited, the light spot 1016 with hardly any aberration is obtained also for the optical disk 1015 with a base material thickness of 1.2 mm like a CD.

A light beam 1017 reflected at the optical disk 1015 again passes through the objective lens 1008, the aperture limiting means 1007 and the beam shaping prism 1006, is converged by the condensing lens 1005, and is incident on the AS correcting prism 1003. The light beam 1017 of a wavelength of 780 nm passes through the AS correcting prism 1003, and is incident on the second module 1013. Then, the light beam 1017 is diffracted at the hologram 1013c, and is incident on the photodetector 1013b to detect a focus control signal for causing the objective lens 1008 to follow the recording surface by use of the SSD method and a tracking control signal for causing the objective lens 1008 to follow the tracks on the track surface by use of the push-pull method.

While the push-pull method is used for simplification of explanation in this embodiment like in the conventional example, the generally frequently used three beam method may be used.

In the optical pickup of this embodiment, an optical system is set in which the objective lens 1008 is used that is designed so that the disk base material thickness is 0.6 mm and the numerical aperture is 0.6 for a wavelength of 650 nm, the focal lengths of the objective lens 1008 and the condensing lens 1005 are 3 mm and 20 mm, respectively, the angle α1 between the first surface and the second surface of the beam shaping prism 1006 is 1.15 degrees, and the angle α2 between the first surface and the second surface of the AS correcting prism 1003 is 2.13 degrees.

Further, by setting the distance from the semiconductor laser 1013a to the condensing system lens 1005 so as to be approximately 6 mm shorter than the distance from the semiconductor laser 1013a to the point at which the beam having passed through the condensing system lens 1005 becomes a parallel beam, in calculation, a light beam of a wavelength of 650 nm and a light beam of a wavelength of 780 nm could be converged on the optical disk 1009 with a base material thickness of 0.6 mm and on the optical disk 1015 with a base material thickness of 1.2 mm with a wavefront aberration of not more than 10 m λ.

As described above, according to this embodiment, by designing the prism that integrates and separates the divergent light for CDs and the divergent light for DVDs so as to generate the astigmatism that cancels the astigmatism generated when the divergent light for CDs passes through the beam shaping prism 1006, the obtained light spots for CDs and DVDs are both excellent. Further, by the beam shaping prism 1006 being disposed on the common optical path, reduction in the size and the thickness of the optical pickup is achieved.

In the AS correcting prism 1003, by appropriately adjusting the incident angle θ2 of the light beam emitted from the second module 1013, the first surface and the second surface of the AS correcting prism 1003 can be made parallel. In that case, since the AS correcting prism 1003 is a flat plate, the entire optical system can be structured more inexpensively.

In short, as long as the relationship between the position of the semiconductor laser 1013a and the position of the surface opposed to the optical film 1004 of the AS correcting prism 1003 with respect to the optical film 1004 is such that the astigmatism for reducing the astigmatism generated when the light beam 1014 from the semiconductor laser 1013a passes through the beam shaping prism 1006 is provided to the light beam 1014 having passed through the AS correcting prism 1003, the optical film 1004 of the AS correcting prism 1003 and the surface opposed to the optical film 1004 may be either parallel or nonparallel to each other.

Figure 10:
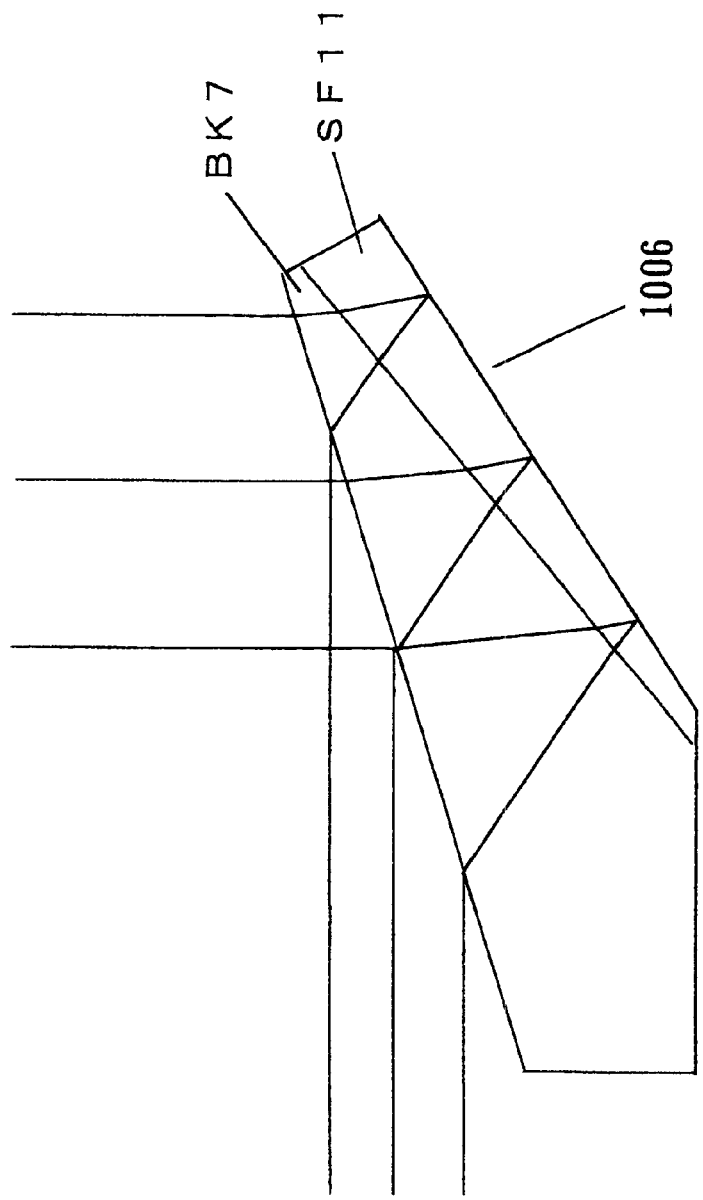
FIG. 10 is a schematic view showing a beam shaping prism in the fifth embodiment of the present invention to which chromatic aberration correcting means is added.

Moreover, it is to be noted that similar effects to those obtained in the fifth embodiment are obtained when a plurality of glass materials is used for the beam shaping prism 1006 as shown in FIG. 10 in order to prevent the light beam from blurring due to variations in the wavelength of the laser light source.

Moreover, by the AS correcting prism 1003 also correcting astigmatisms of the semiconductor laser 1013a and optical elements present on the optical path from the semiconductor laser 1013a to the AS correcting prism 1003, more excellent spots can be obtained. An example of the optical elements is the condensing lens.

While the optical film 1004 is provided on one surface of the AS correcting prism 1003 in the fifth embodiment, the place where the optical film 1004 is provided is not limited to the surface of the AS correcting prism 1003.

Sixth Embodiment

Next, a sixth embodiment will be described. Description of parts and actions similar to those of the fifth embodiment is omitted.

Figure 11:
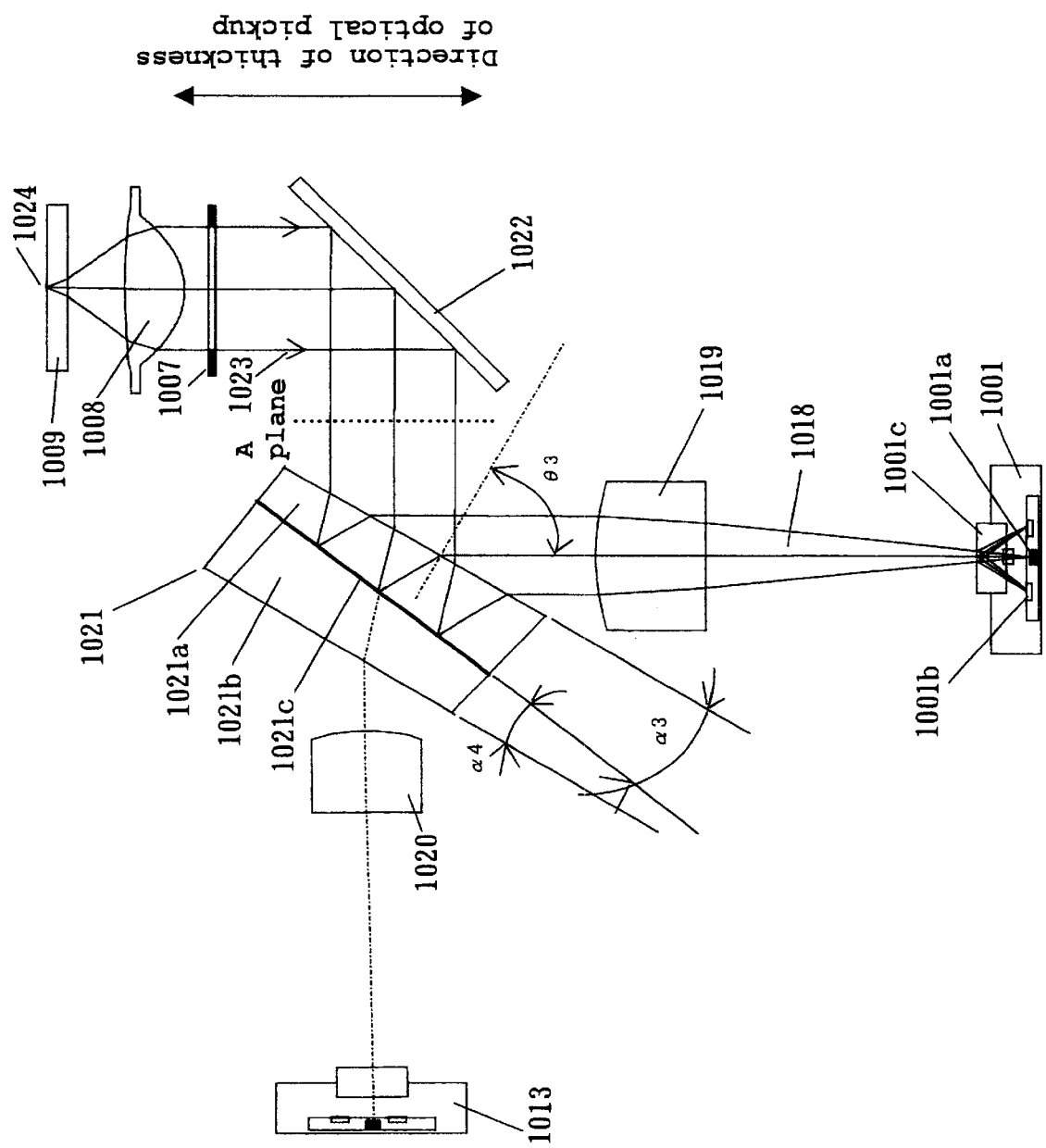
FIG. 11 is a view showing the structure of an optical pickup according to a sixth embodiment of the present invention.
Figure 12:
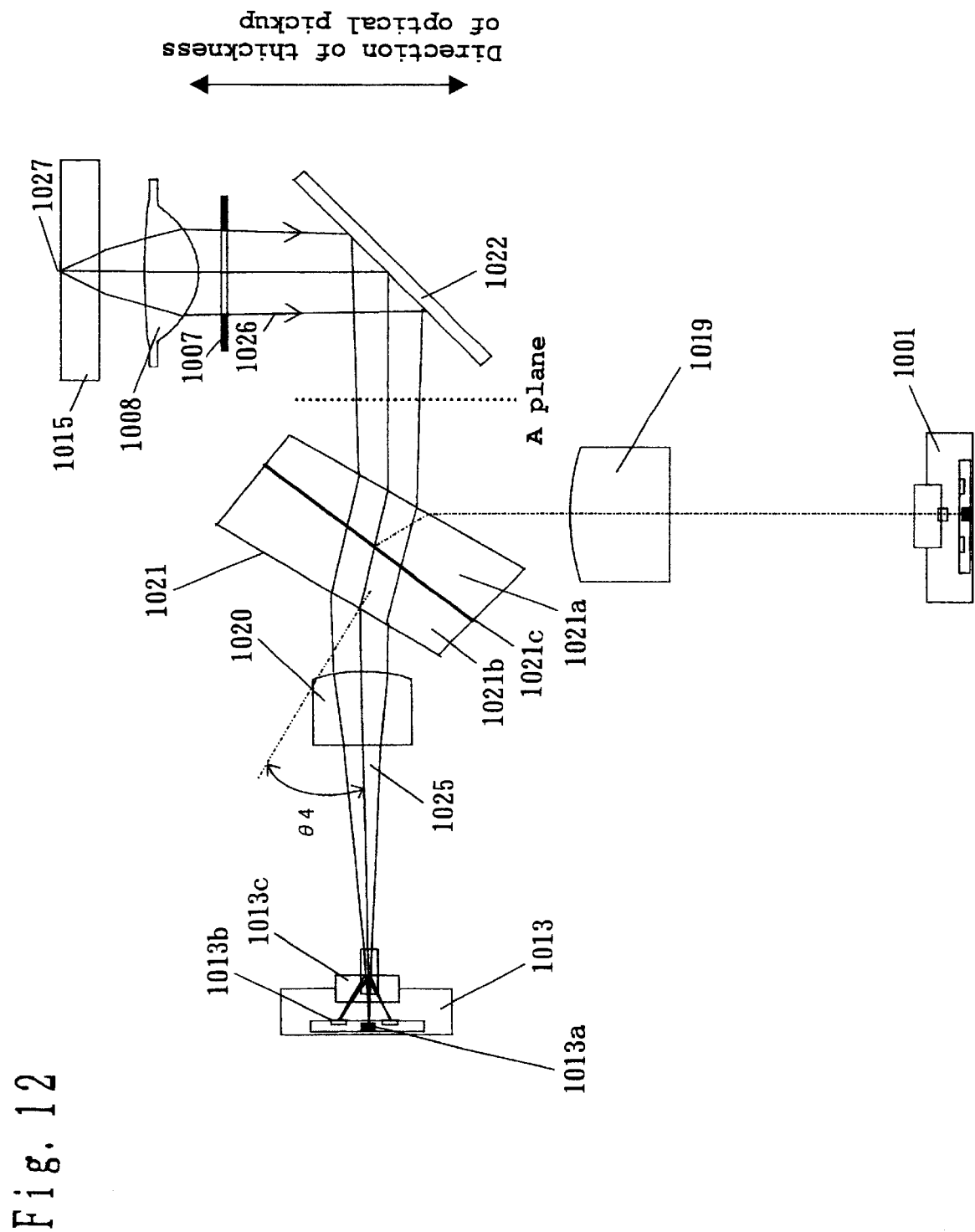
FIG. 12 is a view showing the structure of the optical pickup according to the sixth embodiment of the present invention.

FIGS. 11 and 12 are views showing the structure of an optical pickup according to the sixth embodiment of the present invention. FIG. 11 shows a case where a high-density optical disk 1009 with a base material thickness of 0.6 mm is reproduced in this embodiment. FIG. 12 shows a case where an optical disk 1015 with a base material thickness of 1.2 mm is reproduced.

In FIG. 11, a first module 1001 for reproduction from DVDs comprises the following elements integrated with one another: a semiconductor laser 1001a of a wavelength of 650 nm; a hologram 1001c that disperses the light beam reflected from the optical disk 1009 to provide the light beam with a spatial change; and a photodetector 1001b that receives the reflected light. The positions of the photodetector 1001b and the hologram 1001c are previously adjusted when the module is assembled. While the element that separates the light reflected from the optical disk is a hologram in this embodiment, an optical element such as a prism may be used to obtain a similar effect.

A light beam 1018 is converted into a parallel or substantially parallel beam by a condensing lens 1019, and is incident on a compound prism 1021 at an angle θ3. The compound prism 1021 comprises a beam shaping prism 1021a and an AS correcting prism 1021b which are cemented together by an optical film 1021c. As shown in FIG. 11, the angle between the first surface and the second surface of the beam shaping prism 1021a is α3, and the angle between the first surface and the second surface of the AS correcting prism 1021b is α4.

The optical film 1021c comprises a multilayer film that totally reflects light of wavelengths in the vicinity of 650 nm and transmits light of wavelengths in the vicinity of 780 nm. Therefore, the light beam 1018 is transmitted and reflected only by the beam shaping prism 1021a to be shaped. Then, the light beam 1018 has its optical path bent by a totally reflecting mirror 1022, and is incident on aperture limiting means 1007. Since the aperture limiting means 1007 is the same as that described in the fifth embodiment, the light beam 1018 is aperture-limited with a numerical aperture of 0.6, and is incident on an objective lens 1008.

The light beam 1018 incident on the objective lens 1008 is converged with a numerical aperture of 0.6, and forms a light spot 1024 on the recording surface of the optical disk 1009 with a base material thickness of 0.6 mm. Then, a light beam 1023 reflected at the optical disk 1009 again passes through the objective lens 1008 and the aperture limiting means 1007, and has its optical path again bent by the totally reflecting mirror 1022. Then, the light beam 1023 is again shaped by the beam shaping prism 1021a of the compound prism 1021, is converged by the condensing lens 1019, and is incident on the first module 1001.

The light beam 1023 incident on the first module 1001 is diffracted at the hologram 1001c, and is incident on the photodetector 1001b to detect a focus control signal for causing the objective lens 1008 to follow the recording surface by use of the SSD method and a tracking control signal for causing the objective lens 1008 to follow the tracks on the track surface by use of the phase difference method.

In FIG. 12, a light beam 1025 of a wavelength of 780 nm emitted from a second module 1013 passes through a hologram 1013c, is converted into a slightly divergent system by a condensing lens 1020, and is incident on the compound prism 1021 at an angle θ4. Since the optical film 1021c formed between the AS correcting prism 1021b and the beam shaping prism 1021a transmits light of a wavelength of 780 nm, the compound prism 1021 acts as a single prism.

At this time, by appropriately adjusting the angle of placement of the compound prism 1021 and the angle between the first surface and the second surface of the compound prism 1021, it can be made possible that hardly any aberration is generated when the light beam passes through the compound prism 21. Therefore, the light beam 1025 passes through the compound prism 1021 with hardly any aberration generated, and after the optical path thereof is bent by the totally reflecting mirror 1022, only an inner part thereof corresponding to a numerical aperture of 0.45 is transmitted by the aperture limiting means 1007, is incident on the objective lens 1008, and forms a light spot 1027 on the recording surface of the optical disk 1015. By the light beam 1025 being incident on the objective lens 1008 as a divergent system and aperture-limited, the light spot 1027 with hardly any aberration is obtained also for the optical disk 1015 with a base material thickness of 1.2 mm like a CD.

A light beam 1026 reflected at the optical disk 1015 again passes through the objective lens 1008 and the aperture limiting means 1007, has its optical path bent by the totally reflecting mirror 1022, and is incident on the compound prism 1021. Like on the way to the disk, the light beam 1026 of a wavelength of 780 nm passes through the compound prism 1021 with hardly any change in aberration.

The light beam 1026 incident on the second module 1013 is diffracted at the hologram 1013c, and is incident on the photodetector 1013b to detect a focus control signal for causing the objective lens 1008 to follow the recording surface by use of the SSD method and a tracking control signal for causing the objective lens 1008 to follow the tracks on the track surface by use of the push-pull method.

While the push-pull method is used for simplification of explanation in this embodiment like in the conventional example, the generally frequently used three beam method may be used.

In the optical pickup of this embodiment, an optical system is set in which the objective lens 1008 is used that is designed so that the disk base material thickness is 0.6 mm and the numerical aperture is 0.6 for a wavelength of 650 nm, the focal lengths of the objective lens 1008 and the condensing lens 1005 are 3 mm and 20 mm, respectively, the angle α3 between the first surface and the second surface of the beam shaping prism 1021a is 5.35 degrees, and the angle α4 between the first surface and the second surface of the AS correcting prism 1021b is 5.9 degrees.

Further, by setting the distance from the semiconductor laser 1013a to the condensing system lens 1005 so as to be approximately 6 mm shorter than the distance from the semiconductor laser 1013a to the point at which the beam having passed through the condensing system lens 1005 becomes a parallel beam, in calculation, a light beam of a wavelength of 650 nm and a light beam of a wavelength of 780 nm could be converged on the optical disk 1009 with a base material thickness of 0.6 mm and on the optical disk 1015 with a base material thickness of 1.2 mm with a wavefront aberration of not more than 10 m λ.

As described above, according to this embodiment, by using on the DVD side the beam shaping prism 1021a that performs beam shaping and using for the divergent beam on the CD side the AS correcting prism 1021b for correcting aberrations generated when the light beam passes through the beam shaping prism 1021a, the obtained light spots 1024 and 1027 for DVDs and CDs are both excellent. Further, by integrating the beam shaping prism 1021a and the AS correcting prism 1021b with the optical film 1021c in between, the number of parts can be reduced, so that reduction in the size and the price of the optical pickup is achieved.

In the AS correcting prism 1021b, by appropriately adjusting the incident angle θ4 of the light beam 1025 emitted from the second module 1013, the first surface and the second surface of the AS correcting prism 1021b can be made parallel. In that case, since the AS correcting prism 1021b is a flat plate, the entire optical system can be structured more inexpensively.

In short, as long as the relationship between the position of the semiconductor laser 1013a and the position of the surface opposed to the optical film 1021c of the AS correcting prism 1021b with respect to the optical film 1021c is such that the astigmatism for reducing the astigmatism generated when the light beam 1025 from the semiconductor laser 1013a passes through the beam shaping prism 1021a is provided to the light beam 1025 having passed through the AS correcting prism 1021b, the optical film 1021c of the AS correcting prism 1021b and the surface opposed to the optical film 1021c may be either parallel or nonparallel to each other.

Figure 13:
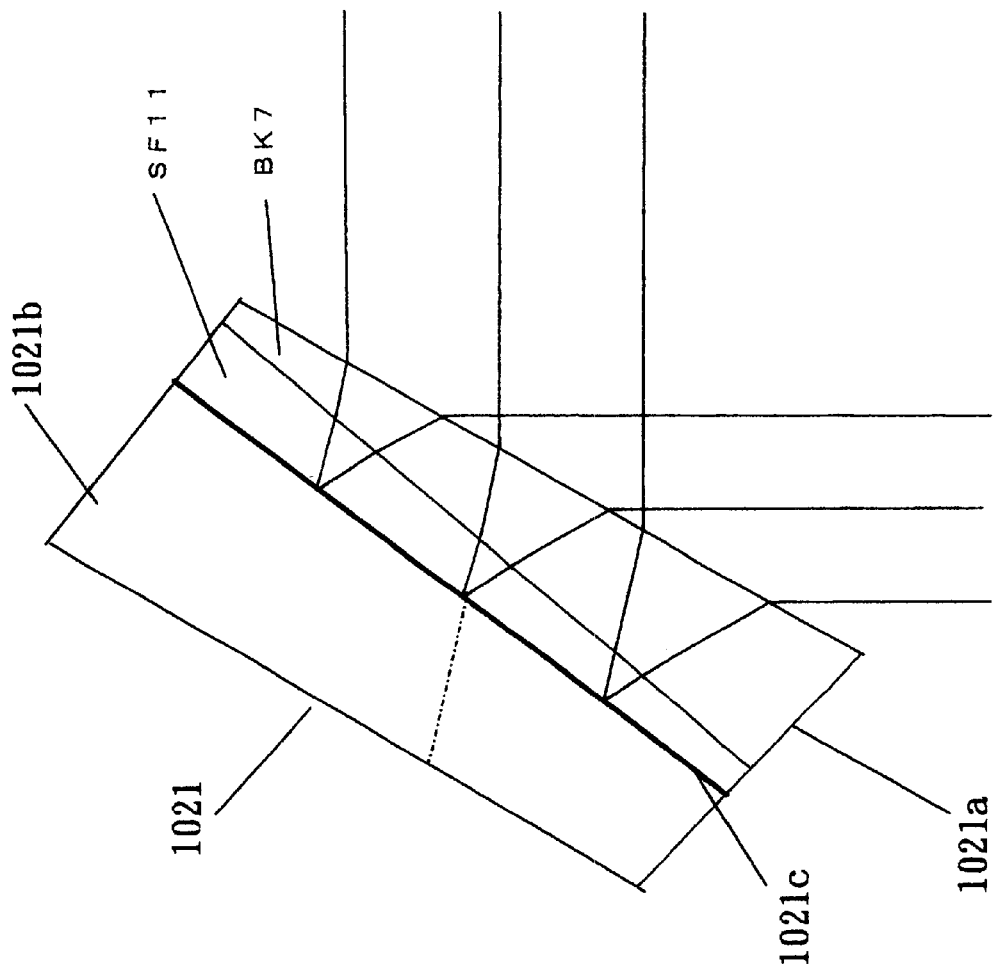
FIG. 13 is a schematic view showing a beam shaping prism in the sixth embodiment of the present invention to which chromatic aberration correcting means is added.

Moreover, it is to be noted that similar effects to those obtained in the sixth embodiment are obtained when a plurality of glass materials is used for the beam shaping prism 1021a as shown in FIG. 13 in order to prevent the light beam from blurring due to variations in the wavelength of the laser light source.

Moreover, by the AS correcting prism 1021b also correcting astigmatisms of the semiconductor laser 1013a and optical elements present on the optical path from the semiconductor laser 1013a to the condensing lens 1020, more excellent spots can be obtained.

The AS correcting prisms 1021b and the beam shaping prisms 1021a are not limited to the ones integrated with each other in the sixth embodiment.

Seventh Embodiment

Next, a seventh embodiment will be described. Description of parts and actions similar to those of the fifth embodiment is omitted.

Figure 14:
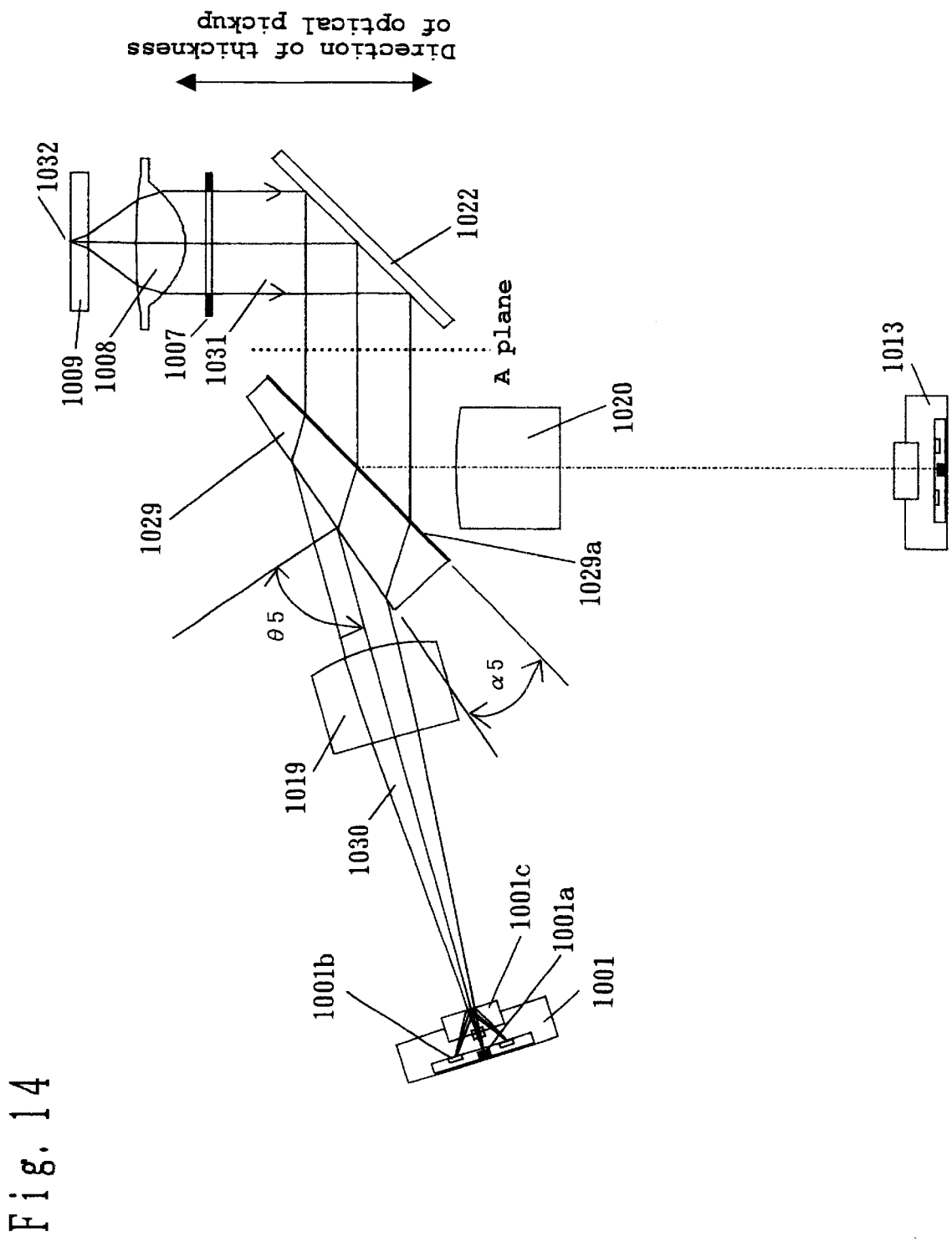
FIG. 14 is a view showing the structure of an optical pickup according to a seventh embodiment of the present invention.
Figure 15:
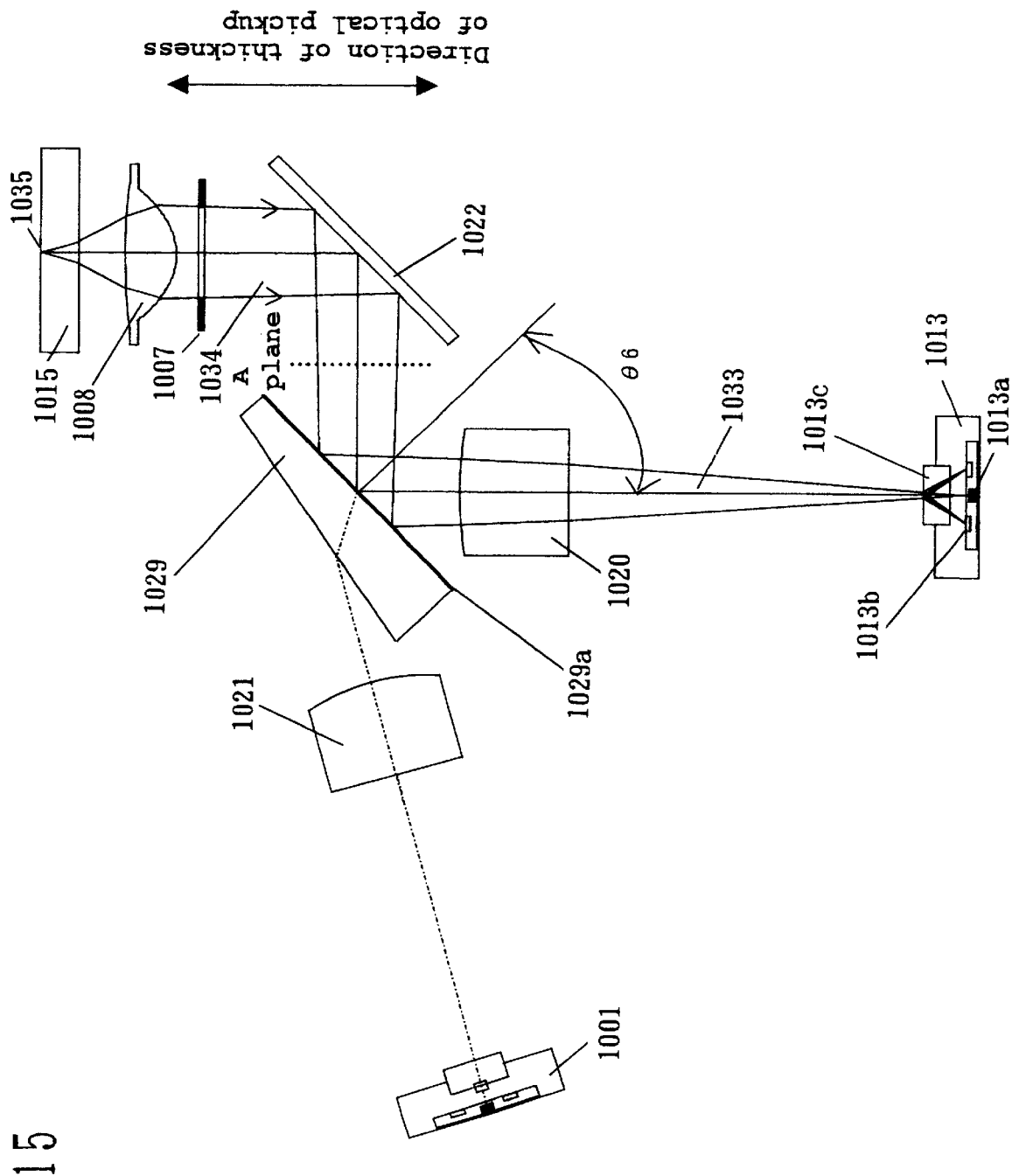
FIG. 15 is a view showing the structure of the optical pickup according to the seventh embodiment of the present invention.

FIGS. 14 and 15 are views showing the structure of an optical pickup according to the seventh embodiment of the present invention. FIG. 14 shows a case where a high-density optical disk 1009 with a base material thickness of 0.6 mm is reproduced in this embodiment. FIG. 15 shows a case where an optical disk 1015 with a base material thickness of 1.2 mm is reproduced.

In FIG. 14, a first module 1001 for reproduction from DVDs comprises the following elements integrated with one another: a semiconductor laser 1001a of a wavelength of 650 nm; a hologram 1001c that disperses the light beam reflected from the optical disk 1009 to provide the light beam with a spatial change; and a photodetector 1001b that receives the reflected light. The positions of the photodetector 1001b and the hologram 1001c are previously adjusted when the module is assembled. While the element that separates the light reflected from the optical disk is a hologram in this embodiment, a prism may be used to obtain a similar effect.

A light beam 1030 emitted from the semiconductor laser 1001a is converted into a parallel or substantially parallel beam by a condensing lens 1019, and is incident on a beam shaping prism 1029 at an angle θ5. In the beam shaping prism 1029, the first surface and the second surface are at an angle α5, and an optical film 1029a is provided on the second surface. The optical film 1029a comprises a multi-layer film that transmits light of wavelengths in the vicinity of 650 nm and totally reflects light of wavelengths in the vicinity of 780 nm.

Consequently, the light beam 1030 is shaped by passing through the beam shaping prism 1029. Then, the light beam 1030 has its optical path bent by a totally reflecting mirror 1022, and is incident on aperture limiting means 1007. Since the aperture limiting means 1007 is the same as that described in the fifth embodiment, the light beam 1030 is aperture-limited with a numerical aperture of 0.6, and is incident on an objective lens 1008. The light beam 1030 incident on the objective lens 1008 is converged with a numerical aperture of 0.6, and forms a light spot 1032 on the recording surface of the optical disk 1009 with a base material thickness of 0.6 mm.

Then, a light beam 1031 reflected at the optical disk 1009 passes through the objective lens 1008 and the aperture limiting means 1007, and has its optical path again bent by the totally reflecting mirror 1022. Then, the light beam 1031 passes through the optical film 1029a to be again shaped by the beam shaping prism 1029, is converged by the condensing lens 1019, and is incident on the first module 1001. The light beam 1031 incident on the first module 1001 is diffracted at the hologram 1001c, and is incident on the photodetector 1001b to detect a focus control signal for causing the objective lens 1008 to follow the recording surface by use of the SSD method and a tracking control signal for causing the objective lens 1008 to follow the tracks on the track surface by use of the phase difference method.

Then, in FIG. 15, a light beam 1033 of a wavelength of 780 nm emitted from a second module 1013 passes through a hologram 1013c, is converted into a slightly divergent system by a condensing lens 1020, and is incident on the beam shaping prism 1029 at an angle θ6. Since the optical film 1029a provided on the second surface of the beam shaping prism 1029 totally reflects light of a wavelength of 780 nm, the beam shaping prism 1029 acts as a totally reflecting mirror.

Then, the light beam 1033 reflected at the beam shaping prism 1029, without optically influenced by the beam shaping prism 1029, has its optical path further bent by the totally reflecting mirror 1022. Then, only an inner part thereof corresponding to a numerical aperture of 0.45 is transmitted by the aperture limiting means 1007, is incident on the objective lens 1008, and forms a light spot 1035 on the recording surface of the optical disk 1015. By the light beam 1033 being incident on the objective lens 1008 as a divergent system and aperture-limited, the optical disk 1015 with a base material thickness of 1.2 mm like a CD can be handled.

A light beam 1034 reflected at the optical disk 1015 again passes through the objective lens 1008 and the aperture limiting means 1007, has its optical path bent by the totally reflecting mirror 1022, and is incident on the beam shaping prism 1029. The light beam 1034 of a wavelength of 780 nm is not optically influenced by the beam shaping prism 1029 because it is totally reflected at the optical film 1029a like on the way to the disk.

The light beam 1034 condensed by the condensing lens 1020 and incident on the second module 1013 is diffracted at the hologram 1013c, and is incident on the photodetector 1013b to detect a focus control signal for causing the objective lens 1008 to follow the recording surface by use of the SSD method and a tracking control signal for causing the objective lens 1008 to follow the tracks on the track surface by use of the push-pull method.

While the push-pull method is used for simplification of explanation in this embodiment like in the conventional example, the generally frequently used three beam method may be used.

As described above, according to this embodiment, by using on the DVD side the beam shaping prism 1029 that performs beam shaping and by the divergent beam on the CD side being totally reflected at the surface of the beam shaping prism 1029, the obtained light spots 1032 and 1035 for DVDs and CDs are both excellent. Further, by forming the beam shaping means and the light integrating and separating means of one optical element, the number of parts can be reduced, so that reduction in the size and the price of the optical pickup can be achieved.

Figure 16:
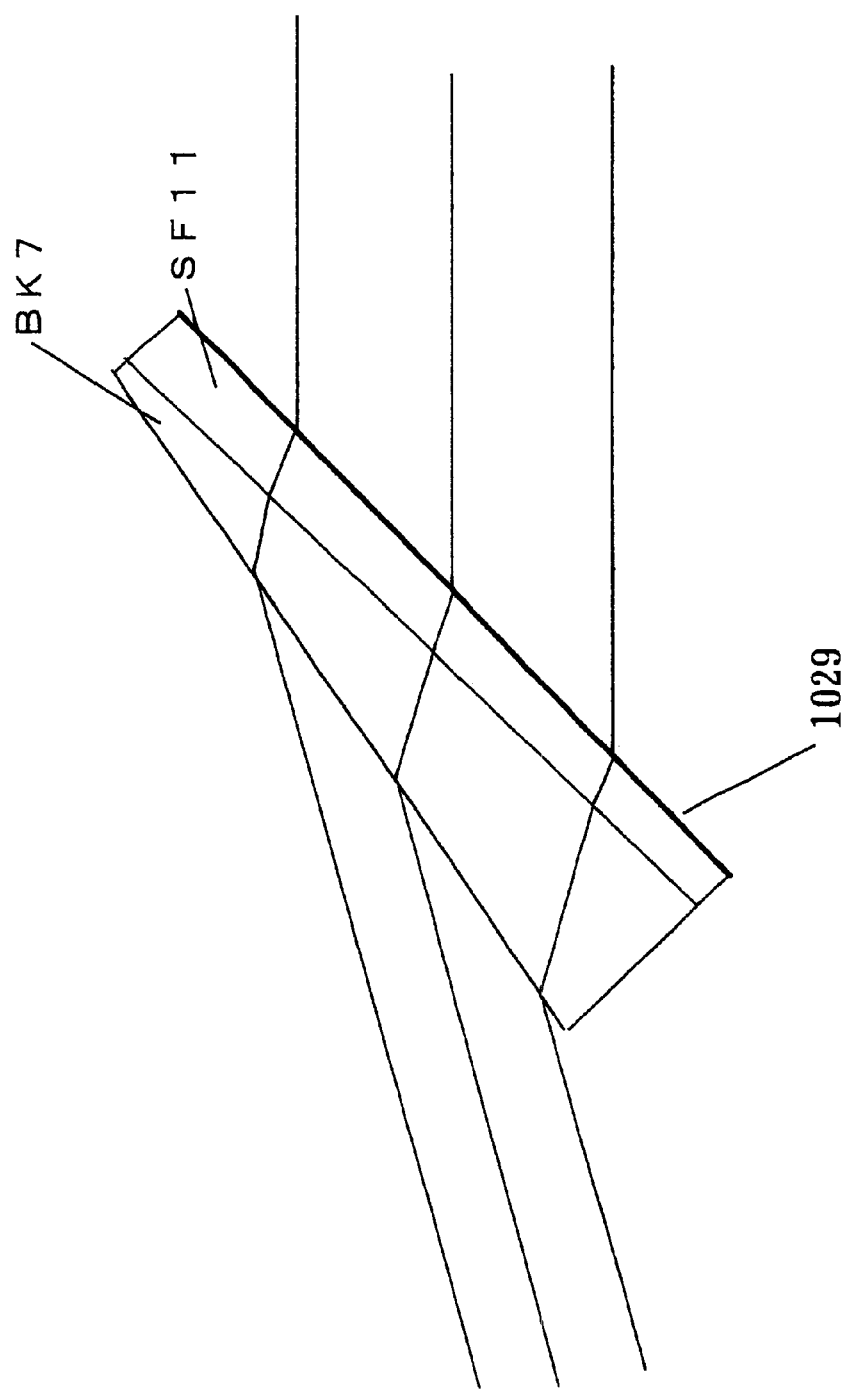
FIG. 16 is a schematic view showing a beam shaping prism in the seventh embodiment of the present invention to which chromatic aberration correcting means is added.

Moreover, it is to be noted that similar effects to those obtained in the seventh embodiment are obtained when a plurality of glass materials is used for the beam shaping prism 1029 as shown in FIG. 16 in order to prevent the light beam from blurring due to variations in the wavelength of the laser light source.

While module elements are used for recording or reproduction onto or from DVDs and for recording or reproduction onto or from CDs in the above described embodiments, similar effects are obtained when the semiconductor laser, the light receiver and the hologram are discrete parts.

Moreover, while structure examples using two light sources are used in the above-described embodiments, similar effects are obtained when more than two light sources are used.

Eighth Embodiment

Next, an eighth embodiment will be described.

Figure 17:
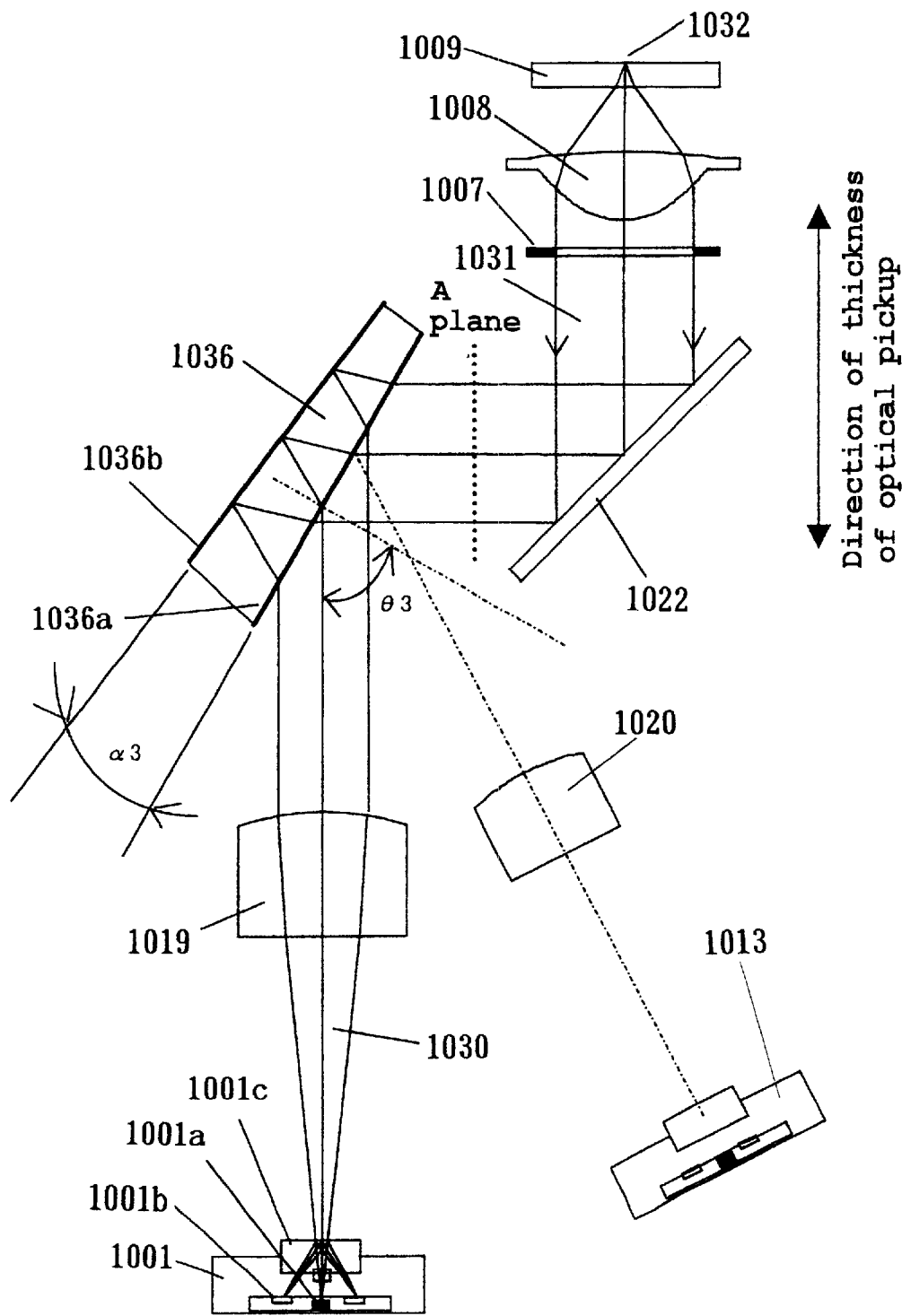
FIG. 17 is a view showing the structure of an optical pickup according to an eighth embodiment of the present invention.
Figure 18:
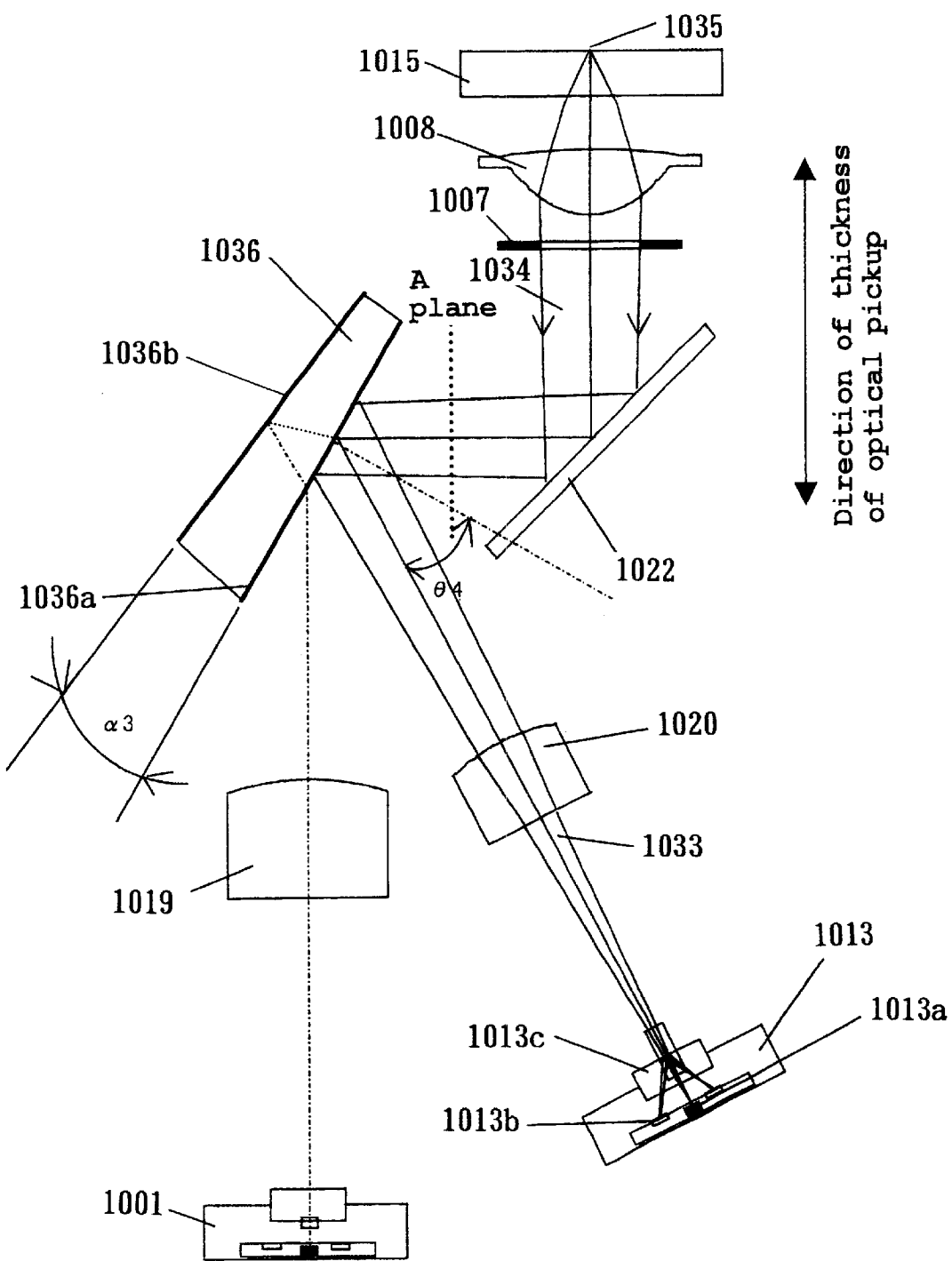
FIG. 18 is a view showing the structure of the optical pickup according to the eighth embodiment of the present invention.

FIGS. 17 and 18 are views showing the structure of an optical pickup according to an eighth embodiment of the present invention. FIG. 17 shows a case where a high-density optical disk 1009 with a base material thickness of 0.6 mm is reproduced in this embodiment. FIG. 18 shows a case where an optical disk 1015 with a base material thickness of 1.2 mm is reproduced.

In the eighth embodiment, a beam shaping prism 1036 is used instead of the beam shaping prism 1029 in the structure of the seventh embodiment. That is, in the seventh embodiment, after converted into a parallel or substantially parallel beam by the condensing lens 1019, the light beam 1030 emitted from the semiconductor laser 1001a is transmitted by the beam shaping prism 1029 to be shaped, whereas in the eighth embodiment, after converted into a parallel or substantially parallel beam by the condensing lens 1019, the light beam 1030 emitted from the semiconductor laser 1001a is incident on the beam shaping prism 1036 and is reflected at a totally reflecting film 1036b to be shaped. Except this, the structure is the same as that of the seventh embodiment.

Consequently, according to this embodiment, by using on the DVD side the beam shaping prism 1036 that performs beam shaping and by the divergent beam on the CD side being totally reflected at the surface of the beam shaping prism 1036, the obtained light spots 1032 and 1035 for DVDs and CDs are both excellent. Further, by forming the beam shaping means and the light integrating and separating means of one optical element, the number of parts can be reduced, so that reduction in the size and the price of the optical pickup can be achieved.

Figure 19:
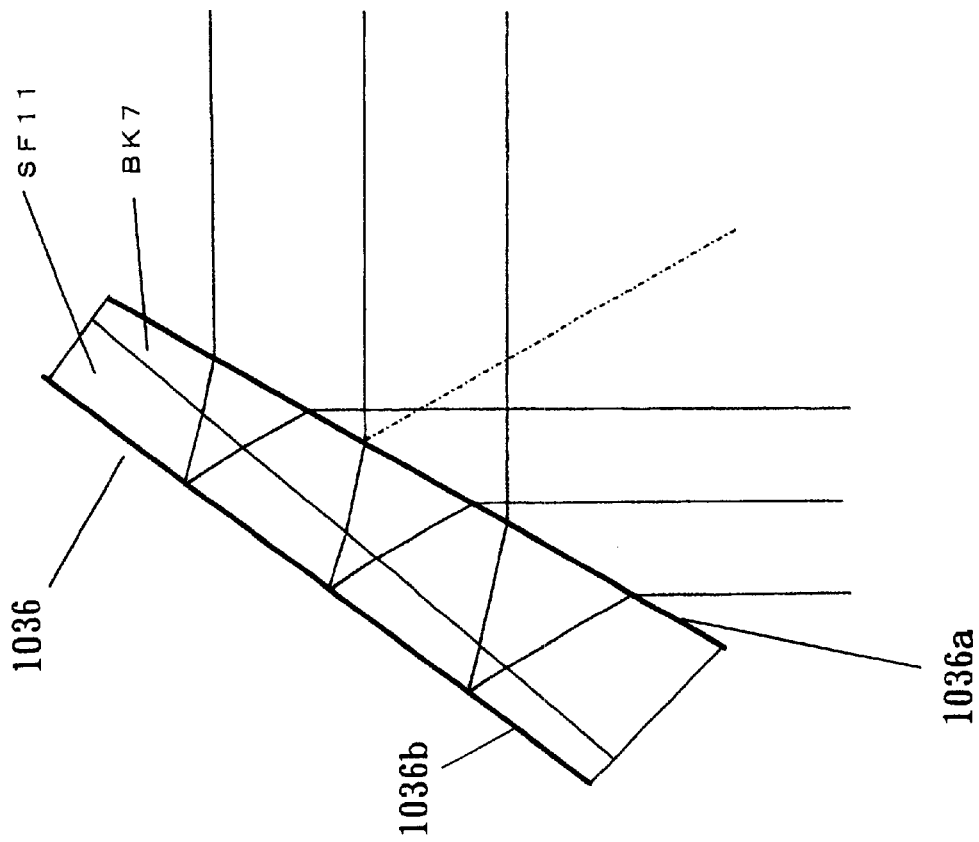
FIG. 19 is a schematic view showing a beam shaping prism in the eighth embodiment of the present invention to which chromatic aberration correcting means is added.
Figure 20:
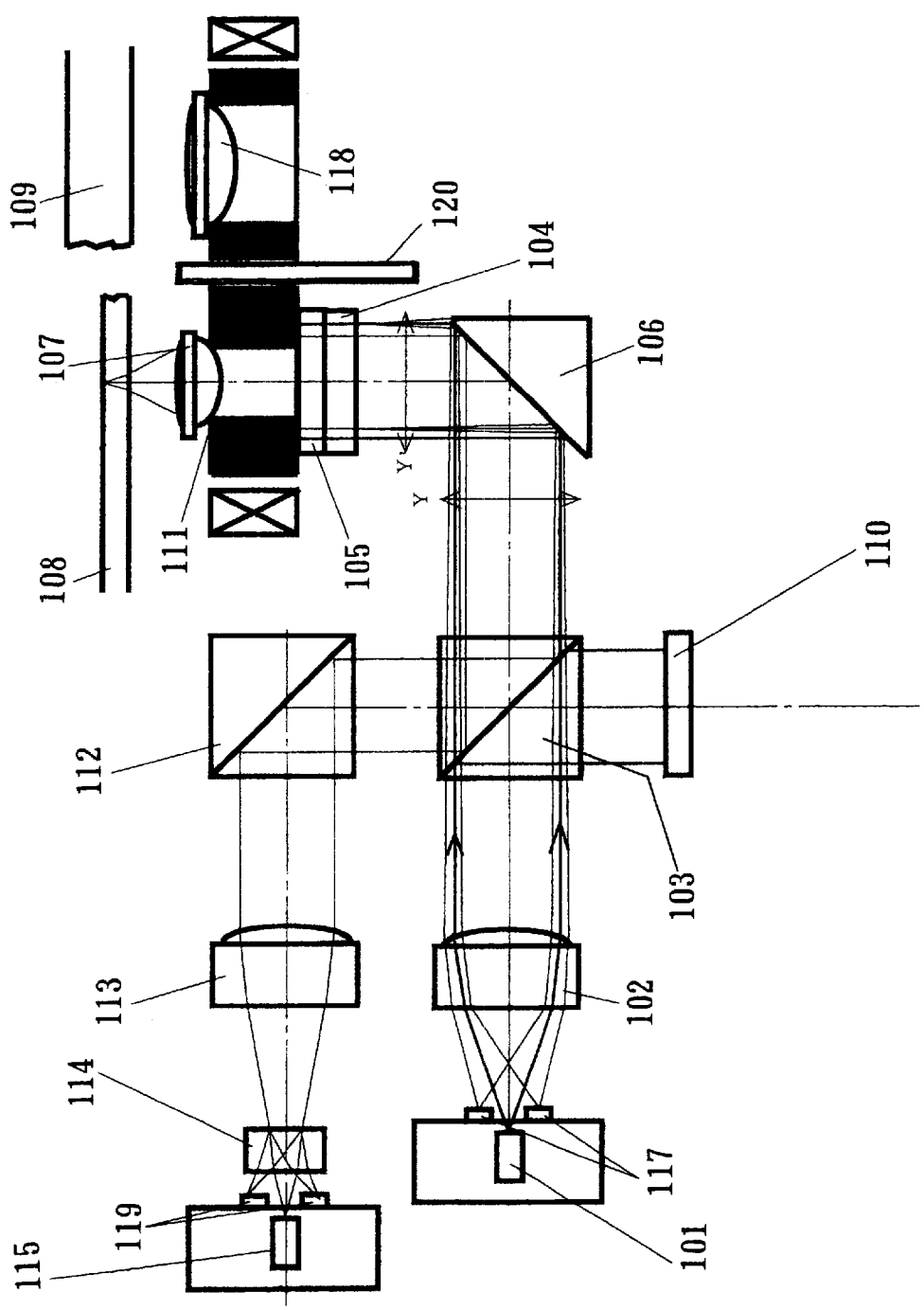
FIG. 20 is a view showing the structure of the optical system of the conventional optical pickup.
Figure 21:
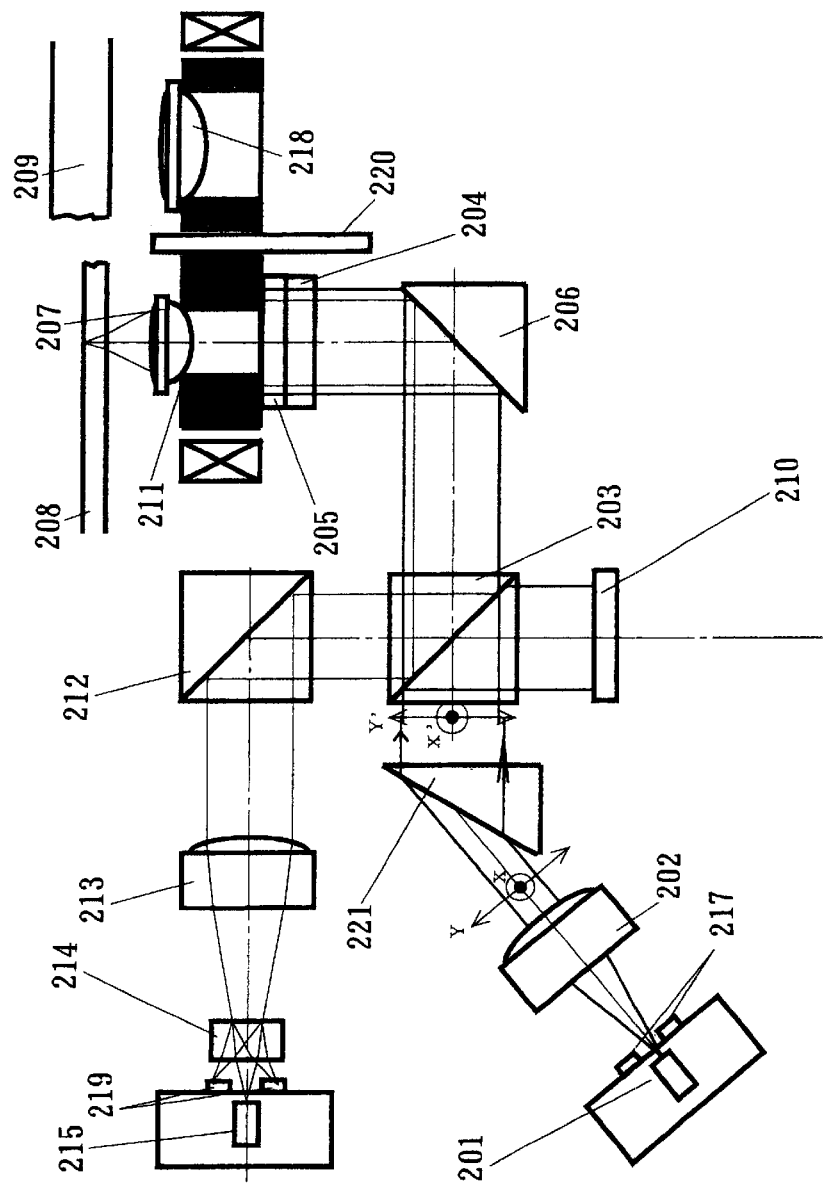
FIG. 21 is a view showing the structure of the optical system of the conventional optical pickup.
Figure 22:
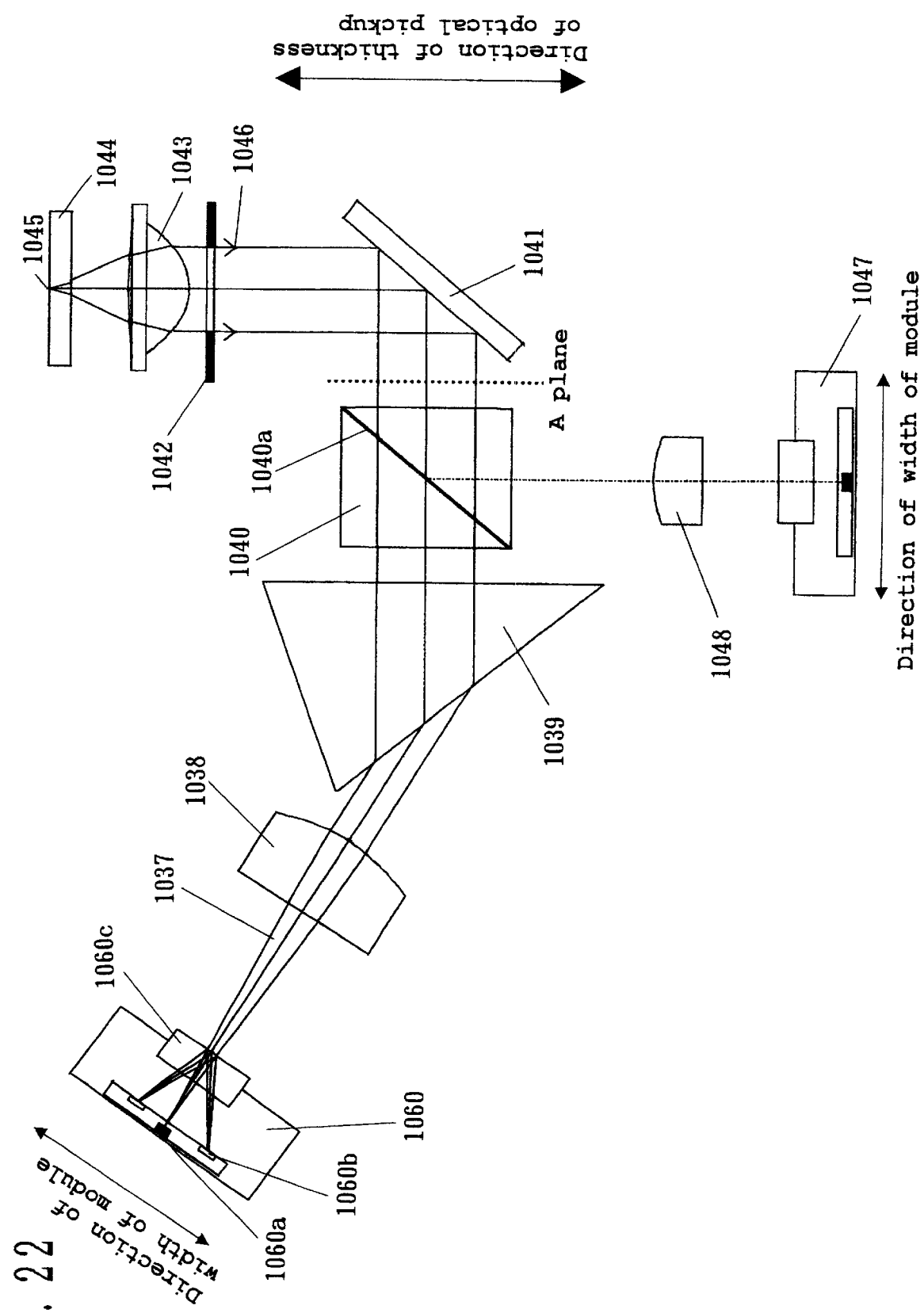
FIG. 22 is a view showing the structure of the conventional optical pickup.
Figure 23:
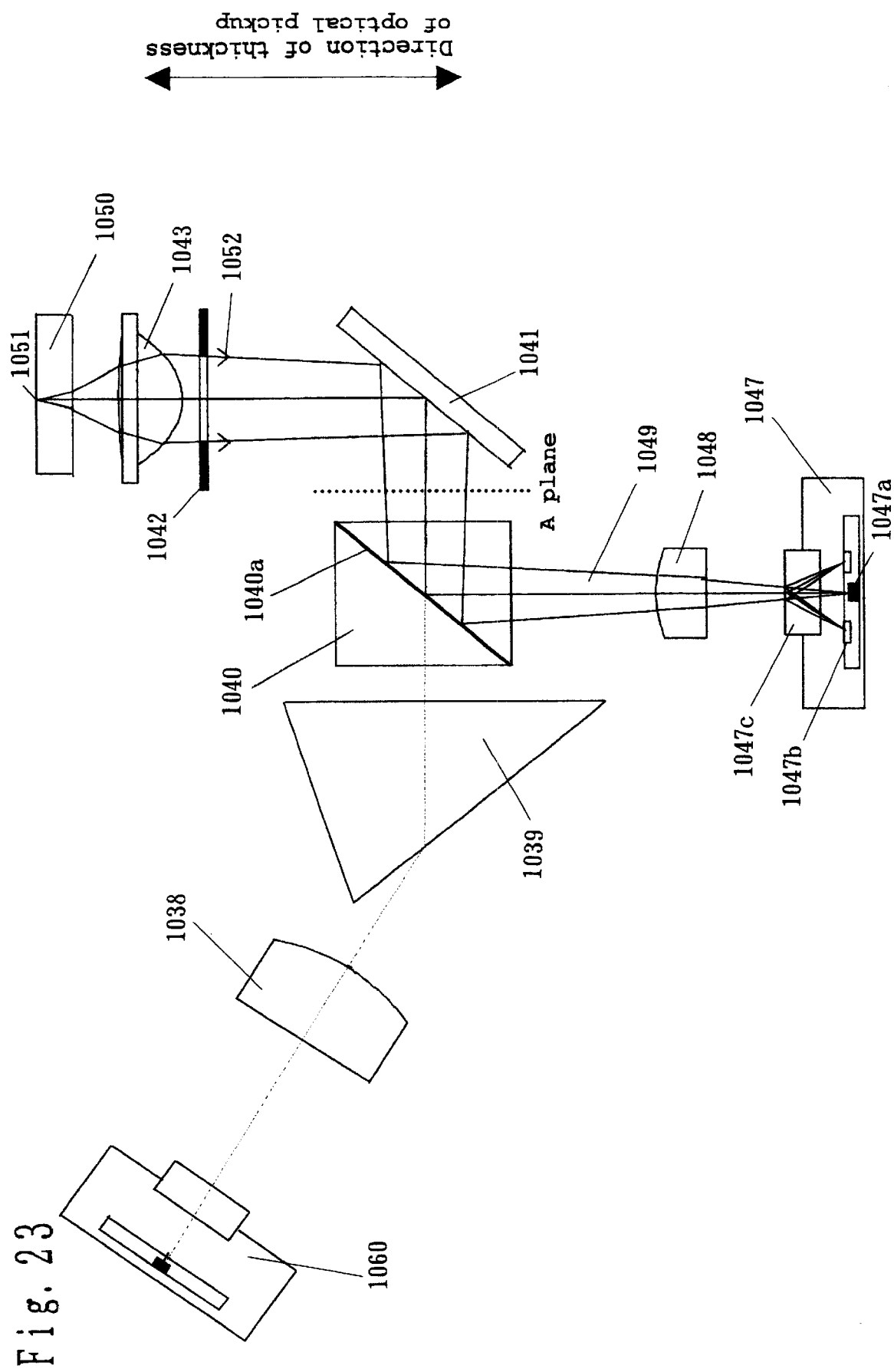
FIG. 23 is a view showing the structure of the conventional optical pickup.

Moreover, it is to be noted that similar effects to those obtained in the eighth embodiment are obtained when a plurality of glass materials is used for the beam shaping prism 1036 as shown in FIG. 19 in order to prevent the light beam from blurring due to variations in the wavelength of the laser light source.

While module elements are used for recording or reproduction onto or from DVDs and for recording or reproduction onto or from CDs in the above-described embodiments, similar effects are obtained when the semiconductor laser, the light receiver and the hologram are discrete parts.

Moreover, while structure examples using two light sources are used in the above-described embodiments, similar effects are obtained when more than two light sources are used.

The condensation of the light beams from the semiconductor lasers to optical disks and the detection of the light beams reflected at optical disks in the fifth to the eighth embodiments can be used for recording of information onto the optical disks and can be used for reproduction of information recorded on optical disks. In other words, the optical pickups of the fifth to the eighth embodiments can be used both when information is recorded onto optical disks and when information is reproduced from optical disks.

Moreover, while in the fifth to the eighth embodiments, the wavelength of the light beam emitted from the semiconductor laser 1001a of the first module 1001 and the wavelength of the light beam emitted from the semiconductor laser 1013a of the second module 1013 are different, since information recording and information reproduction can be performed by condensing light beams of substantially the same wavelengths on a plurality of optical disks having different base material thicknesses, the wavelength of the light beam emitted from the semiconductor laser 1001a and the wavelength of the light beam emitted from the semiconductor laser 1013a are not limited to different ones; they may be substantially the same.

As is apparent from the description given above, an optical pickup can be provided with which light use efficiency can be enhanced without any increase in the number of parts.

Moreover, according to the present invention, an optical pickup can be provided in which in an optical system using two light sources of different wavelengths for which one objective lens is used, even when a beam shaping prism is used, excellent spots are obtained for both of the wavelengths, and reduction in thickness and size can be achieved.

That is, according to the present invention, by providing on the optical path only on the CD side astigmatism correcting means of correcting astigmatism generated when the light beam is transmitted as a divergent beam on the CD side by the beam shaping prism used as the beam shaping means on the DVD side, an excellent spot is obtained also on the CD side. Alternatively, by the divergent beam on the CD side being integrated with the beam on the DVD side by being reflected at the surface of a beam shaping prism used as the beam shaping means on the DVD side, an excellent spot is obtained also on the CD side. As described above, by forming a beam shaping prism in the optical system common to the CD side and the DVD side and the beam shaping prism acting also as the light integrating and separating means, reduction in the size and the thickness of the optical pickup is achieved.

What is claimed is:

1. An optical pickup comprising:
    a light source that emits a light beam having a far field pattern being elliptical in cross section;
    a collimator lens that converts the light beam from said light source into a substantially parallel light beam;
    a beam shaping element that performs beam shaping by changing a substantial aspect ratio of the far field pattern of the light beam from said collimator lens;
    light condensing means of condensing the light beam shaped by said beam shaping element on an optical information recording medium; and
    light detecting means of detecting a light beam reflected at said optical information recording medium.
    wherein said beam shaping element makes the cross section of the light beam having been shaped close to a circle by compressing the light beam substantially in a direction of a major axis of the elliptical cross section of the far field pattern, and reflects the light beam from said collimator lens to said light condensing means.

2. An optical pickup according to claim 1, wherein said beam shaping element has a light incident and exit surface and a reflecting surface, and the light incident and exit surface and the reflecting surface are nonparallel to each other.

3. An optical pickup according to claim 1 or 2, further comprising an adjusting mechanism that corrects an astigmatism in an optical system by changing relative positions of said collimator lens and said beam shaping element.

4. An optical pickup according to claim 1 or 2, wherein said beam shaping element compresses a diameter substantially in the direction of the major axis of the far field pattern within a range of 0.85 to 0.95 with respect to an input light beam.

5. An optical pickup according to claim 1 or 2, wherein a first light source and a second light source that emit light beams of different wavelengths are provided, and two optical systems comprising said first light source and said second light source share said collimator lens and said beam shaping element.

6. An optical pickup according to claim 5, wherein an optical axis of incidence on said collimator lens and an optical axis of incidence on said beam shaping element are different between said two optical systems.

7. An optical pickup according to claim 5, further comprising a light transmitting parallel or nonparallel plate that is disposed between said first light source and said collimator lens and/or between said second light source and said collimator lens.

8. An optical pickup comprising:
    a first light source that emits a first light beam;
    light condensing means of condensing said first light beam from said first light source;
    beam shaping means of shaping said first light beam condensed by said condensing means;
    converging means of converging said first light beam shaped by said beam shaping means, on a first optical disk corresponding to said first light beam;
    a second light source that emits a second light beam; and
    astigmatism providing means of providing a predetermined astigmatism to said second light beam from said second light source,
    wherein said second light source is disposed in a position such that the light beam it emits passes through said astigmatism providing means and is directed to said beam shaping means,
    said converging means converges said second light beam from said second light source on a second optical disk corresponding to said second light beam,
    said astigmatism providing means is disposed between said second light source and said beam shaping means, and
    a relationship between a position of said second light source and a position of said astigmatism providing means is such that an astigmatism for reducing an astigmatism generated when said second light beam passes through said beam shaping means is provided to said second light beam having passed through said astigmatism providing means.

9. An optical pickup comprising:

a first light source that emits a first light beam;

reflecting means of reflecting said first light beam from said first light source, said reflecting means being substantially a plane, light condensing means of condensing said first light beam reflected at said reflecting means;

beam shaping means of shaping said first light beam condensed by said light condensing means;

converging means of converging said first light beam shaped by said beam shaping means, on a first optical disk corresponding to said first light beam;

a second light source that emits a second light beam; and astigmatism providing means of providing a predetermined astigmatism to said second light beam from said second light source, wherein said reflecting means has a function of transmitting said second light beam, said second light source is disposed in a position such that the light beam it emits passes through said reflecting means and is directed to said light condensing means and said beam shaping means, said converging means converges said second light beam from said second light source on a second optical disk corresponding to said second light beam, said astigmatism providing means is disposed between said second light source and said reflecting means, and has a light incident surface and a light exit surface, said light exit surface and said reflecting means being substantially parallel to each other, and a relationship between a position of said second light source and a position of said light incident surface of said astigmatism providing means with respect to said reflecting means is such that an astigmatism for reducing an astigmatism generated when said second light beam passes through said beam shaping means is provided to said second light beam having passed through said astigmatism providing means.

10. An optical pickup according to claim 9, wherein said reflecting means and said light exit surface of said astigmatism providing means are in contact with each other, and said reflecting means and said astigmatism providing means are integrated with each other.

11. An optical pickup according to claim 9 or 10, further comprising an optical element disposed between said second light source and said astigmatism providing means, wherein a relationship between a position of said second light source and a position of said light incident surface of said astigmatism providing means with respect to said reflecting means is such that an astigmatism for reducing an astigmatism of said second light beam based on said second light source and/or an astigmatism of said second light beam based on said optical element is provided to said second light beam having passed through said astigmatism providing means.

12. An optical pickup comprising:

a first light source that emits a first light beam;

light condensing means of condensing said first light beam from said first light source;

beam shaping means having a function of shaping said first light beam condensed by said condensing means, and having a reflecting surface that reflects said first light beam;

converging means of converging said first light beam shaped and reflected by said beam shaping means, on a first optical disk corresponding to said first light beam;

a second light source that emits a second light beam; and astigmatism providing means of providing a predetermined astigmatism to said second light beam from said second light source, wherein said reflecting surface of said beam shaping means has a function of transmitting said second light beam;

said second light source is disposed in a position such that the light beam it emits passes through said beam shaping means and is directed to said converging means, said converging means converges said second light beam from said second light source on a second optical disk corresponding to said second light beam, said astigmatism providing means is disposed between said second light source and said beam shaping means, and has a light incident surface and a light exit surface, said light exit surface and said reflecting surface of said beam shaping means being substantially parallel to each other, and a relationship between a position of said second light source and a position of said light incident surface of said astigmatism providing means with respect to said reflecting surface of said beam shaping means is such that an astigmatism for reducing an astigmatism generated when said second light beam passes through said beam shaping means is provided to said second light beam having passed through said astigmatism providing means.

13. An optical pickup according to claim 12, wherein said reflecting surface of said beam shaping means and said light exit surface of said astigmatism providing means are in contact with each other, and said beam shaping means and said astigmatism providing means are integrated with each other.

14. An optical pickup according to claim 12 or 13, further comprising an optical element disposed between said second light source and said astigmatism providing means, wherein a relationship of a position of said second light source and a position of said light incident surface of said astigmatism providing means with said reflecting surface of said beam shaping means is such that an astigmatism for reducing an astigmatism of said second light beam based on said second light source and/or an astigmatism of said second light beam based on said optical element is provided to said second light beam having passed through said astigmatism providing means.

15. An optical pickup comprising:

a first light source that emits a first light beam;

light condensing means of condensing said first light beam from said first light source;

beam shaping means of shaping said first light beam condensed by said condensing means;

converging means of converging said first light beam shaped by said beam shaping means, on a first optical disk corresponding to said first light beam;

a second light source that emits a second light beam; and reflecting means of reflecting said second light beam from said second light source and transmitting said first light beam, said reflecting means being integrally provided on a predetermined surface of said beam shaping means, wherein said converging means converges said second light beam from said second light source on a second optical disk corresponding to said second light beam.

16. An optical pickup comprising:

a first light source that emits a first light beam;

light condensing means of condensing said first light beam from said first light source;

beam shaping means of shaping said first light beam condensed by said condensing means, and transmitting said first light beam;

converging means of converging said first light beam shaped by said beam shaping means and transmitted by said beam shaping means, on a first optical disk corresponding to said first light beam;

a second light source that emits a second light beam; and reflecting means of reflecting said second light beam from said second light source and transmitting said first light beam, said reflecting means being disposed on a surface of said beam shaping means from which said first light beam exits, wherein said converging means converges said second light beam from said second light source on a second optical disk corresponding to said second light beam.

17. An optical pickup comprising:

a first light source that emits a first light beam;

light condensing means of condensing said first light beam from said first light source;

beam shaping means of shaping said first light beam condensed by said condensing means, and reflecting said first light beam;

converging means of converging said first light beam shaped and reflected by said beam shaping means, on a first optical disk corresponding to said first light beam;

a second light source that emits a second light beam; and reflecting means of reflecting said second light beam from said second light source and transmitting said first light beam, said reflecting means being disposed on a surface of said beam shaping means on and from which said first light beam is incident and exits, wherein said converging means converges said second light beam from said second light source on a second optical disk corresponding to said second light beam.

18. An optical pickup according to any of claims 8, 9, 10, 12, 13, 15, 16 and 17, wherein said first light beam emitted from said first light source and said second light beam emitted from said second light source are different in wavelength.

19. An optical pickup according to any of claims 8, 9, 10, 12, 13, 15, 16 and 17, wherein said beam shaping means also has a function of correcting chromatic aberration of said first light beam from said first light source.

* * * * *